US011263122B2

(12) United States Patent
McClure

(10) Patent No.: US 11,263,122 B2
(45) Date of Patent: Mar. 1, 2022

(54) IMPLEMENTING FINE GRAIN DATA COHERENCY OF A SHARED MEMORY REGION

(71) Applicant: VMware, Inc., Palo Alto, CA (US)

(72) Inventor: Matthew D. McClure, Alameda, CA (US)

(73) Assignee: VMware, Inc., Palo Alto, CA (US)

( * ) Notice: Subject to any disclaimer, the term of this patent is extended or adjusted under 35 U.S.C. 154(b) by 418 days.

(21) Appl. No.: 16/378,879

(22) Filed: Apr. 9, 2019

(65) Prior Publication Data

US 2020/0327048 A1  Oct. 15, 2020

(51) Int. Cl.
*G06F 12/0802* (2016.01)
*G06F 9/455* (2018.01)
*G06F 12/02* (2006.01)

(52) U.S. Cl.
CPC ........ *G06F 12/023* (2013.01); *G06F 9/45558* (2013.01); *G06F 12/0802* (2013.01); *G06F 2009/45583* (2013.01); *G06F 2212/152* (2013.01)

(58) Field of Classification Search
None
See application file for complete search history.

(56) References Cited

U.S. PATENT DOCUMENTS 10,162,665 B1 * 12/2018 Eidelman ................. G06F 13/24
10,169,065 B1 *  1/2019 Nye ......................... H04L 67/28
10,956,202 B1 *  3/2021 Sicron .................... G06F 3/0664

| 2007/0294666 A1* | 12/2007 | Papakipos ........... G06F 11/3644 717/119 |
| 2010/0094948 A1* | 4/2010 | Ganesh ................. G06F 9/4856 709/212 |
| 2014/0189332 A1* | 7/2014 | Ben-Kiki ............... G06F 9/384 712/244 |
| 2015/0378766 A1* | 12/2015 | Beveridge ........... G06F 9/45558 718/1 |
| 2015/0378831 A1* | 12/2015 | Tarasuk-Levin .... G06F 11/1446 714/15 |

(Continued)

FOREIGN PATENT DOCUMENTS

EP          3385848 A1 * 10/2018   ............... G06T 1/20

OTHER PUBLICATIONS

Torbjorn Sorman, "Comparison of Technologies for General-Purpose Computing on Graphics Processing Units", ttps://iu.divaportal.org/smash/get/diva2:909410/FULLTEXT01.pdf.

(Continued)

*Primary Examiner* — Isaac Tuku Tecklu
(74) *Attorney, Agent, or Firm* — Patterson + Sheridan, LLP

(57) ABSTRACT

The disclosure provides an approach for implementing fine grain data coherency of a memory region shared by an application within a virtual machine and a compute accelerator. The approach includes locating within a compute kernel a data write instruction to the shared memory region, and modifying the compute kernel to add a halting point after the data write instruction. The approach further includes configuring a virtualization system on which the virtual machine runs to set a value of a halt variable to true at an interval or in response to an occurrence of an event, wherein setting the halt variable to true causes the compute kernel to suspend execution at the conditional halting point.

20 Claims, 10 Drawing Sheets

(56) References Cited

U.S. PATENT DOCUMENTS

| | | | | |
|---|---|---|---|---|
| 2015/0381589 | A1* | 12/2015 | Tarasuk-Levin | G06F 9/45558 713/193 |
| 2016/0321113 | A1* | 11/2016 | Pinto | G06F 9/4856 |
| 2017/0149921 | A1* | 5/2017 | Nassi | H04L 67/2842 |
| 2018/0203801 | A1* | 7/2018 | Leslie-Hurd | G06F 12/1475 |
| 2018/0293690 | A1* | 10/2018 | Ray | G06F 12/0831 |
| 2018/0293776 | A1* | 10/2018 | Ray | G06T 15/005 |
| 2018/0373556 | A1* | 12/2018 | Tian | G06F 9/4881 |
| 2019/0018800 | A1* | 1/2019 | Jayasena | G06F 12/1441 |
| 2019/0065281 | A1* | 2/2019 | Bernat | G06F 15/7867 |
| 2019/0220323 | A1* | 7/2019 | Belmar | G06F 9/4843 |
| 2020/0034175 | A1* | 1/2020 | Calciu | G06F 12/0891 |
| 2020/0034200 | A1* | 1/2020 | Calciu | G06F 15/17331 |
| 2020/0142608 | A1* | 5/2020 | Nassi | G06F 9/5033 |
| 2020/0174905 | A1* | 6/2020 | Borello | G06F 9/5077 |
| 2020/0204463 | A1* | 6/2020 | Guan | H04L 63/1441 |
| 2020/0320664 | A1* | 10/2020 | Glanville | G06F 12/0802 |
| 2021/0049728 | A1* | 2/2021 | Ray | G06T 1/60 |
| 2021/0133104 | A1* | 5/2021 | Nair | G06F 12/0897 |
| 2021/0200690 | A1* | 7/2021 | Muthukrishnan | G06F 12/1475 |
| 2021/0201556 | A1* | 7/2021 | Ray | G06F 9/4881 |

OTHER PUBLICATIONS

Ren Wu, "GPU-Accelerated Large Scale Analytics" http://www.hpl.hp.com/techreports/2009/HPL-2009-38.pdf.

Alex Krizhevsky, Ilya Sutskever, and Geoffrey E. Hinton, "ImageNet Classification with Deep Convolutional Neural Networks", http://www.nvidia.com/content/tesla/pdf/machine-learning/imagenetclassification-with-deep-convolutional-nn.pdf.

Jianbin Fang, Ana Lucia Varbanescu and Henk Sips, "A Comprehensive Performance Comparison of CUDA and OpenCL" https://pdfs.semanticscholar.org/d4e5/8e7c95d66f810252af630e74adbdbaf38da7.pdf.

James Alan Farrell, "Compiler Basics", http://www.cs.man.ac.uk/~pjj/farrell/comp3.html, Aug. 1995.

Khronos OpenCL Working Group, "The OpenCL Environment Specification, Version: 2.1,", https://www.khronos.org/registry/OpenCL/specs/opencl-2.1-environment.pdf.

Intel Corporation, "OpenCL 2.0 Shared Virtual Memory Overview", https://software.intel.com/sites/default/files/managed/86/1f/SVMOverview.pdf.

Andrea Arcangeli, "Integrating KVM with the Linux Memory Management", https://www.linuxkvm.org/images/3/33/KvmForum2008%24kdf2008_15.pdf.

Msdn, "Fence-Based Resource Management", https://msdn.microsoft.com/enus/library/windows/desktop/dn899125 (v=vs. 85).aspx.

Neil Parris, "Exploring How Cache Coherency Accelerates Heterogeneolus Compute" Community arm com/processors/b/blog/posts exploring-how-cache-coherency-accelerates-heterogeneous-compute.

Software.intel.com/en-us/articles/opencl-20-shared-virtual-memory-overview.

* cited by examiner

IMPLEMENTING FINE GRAIN DATA COHERENCY OF A SHARED MEMORY REGION

CROSS-REFERENCE TO RELATED APPLICATION(S)

This application is related to U.S. patent application Ser. No. 15/990,537, entitled "Live Migration of a Virtualized Compute Accelerator Workload," filed May 25, 2018. This application is also related to U.S. patent application Ser. No. 15/990,540, entitled "Live Migration of a Virtualized Compute Accelerator Workload," filed May 25, 2018. The entire contents of both of these applications are hereby incorporated by reference.

BACKGROUND

A compute accelerator (CA) is a specialized type of processor that performs certain mathematical calculations much faster than a conventional central processing unit (CPU). For example, a graphics processing unit (GPU) is a CA specially designed to rapidly manipulate and alter memory for the creation of images intended for output to a display device. Today, GPUs have been adopted as CAs for many fields of high performance computing outside of graphics processing, such as big data, artificial intelligence, neural networks, and cryptography. Other examples of CAs include specialized silicon, digital signal processors (DSPs), and field-programmable gate array (FPGAs).

CAs typically function in groups or farms in which many CAs work together to execute a kernel so as to perform a CA workload for that kernel. As used herein, a "kernel" is unrelated to the kernel of an operating system. In the context of CAs, a "kernel" or "compute kernel" is a small piece of code with one or more loops, and the loop(s) is executed many times by a CA or group of CAs to perform a CA workload. For example, to perform the CA workload of a transpose operation on a matrix, each column in the original matrix is turned into a row in the solution matrix. Turning each column of a matrix into a row is a simple but repetitive task. A very large matrix may be divided among several CAs, with each CA transposing a portion of the matrix.

As used herein, a "compute accelerator workload" includes (a) the set of operations that needs to be performed by one or more CAs in order to finish a distinct job on a working set, and (b) all data needed to perform the set of operations. For example, to perform the CA workload of a "matrix transpose," CA(s) needs to turn all columns of a matrix into rows. In this example, the CA workload may include the original matrix, the kernel containing logic of the transposition, the current value of variables used by the kernel, and any resulting transposed matrix data that has been generated. As used herein, a "working set" of a CA workload is the data on which the kernel works while performing the operations of a CA workload. For example, the original matrix may be the working set for a "matrix transpose" CA workload.

Depending on the size of a working set or on the workload to be performed on that working set, the CA workload may take a significant amount of time. Some CA workloads may take hours, days, or weeks to finish. Due to the nature of how CAs operate, it is typically impossible to pause a CA workload and resume it again later from the same point of execution. If a compute CA is interrupted, it must be started again from the beginning.

This is disadvantageous for several reasons. CAs may be shared between applications or tenants. If one application uses the CAs for a prolonged period of time, other tenants or applications may not be able to perform any CA workloads during that time. Another reason is that during execution of a CA workload, it may be desirable to migrate the workload from one host computer to another host computer. For example, CAs may reside on different sets of hardware (e.g., different host computers) and the CAs of one or more host computers may be used to execute a CA workload. The migration might be desirable for load balancing reasons, such as to evenly utilize hosts available in a cluster of hosts. The migration might also be desirable for fault tolerance. For example, if certain hardware malfunctions during execution of a CA workload, it might be desirable to pause the workload, move it to another set of hardware (another host computer), and resume the workload where it left off.

When migrating a CA workload from one host computer to another, compatibility issues might arise. For example, a source host computer might have a hardware platform that allows for reliable (i.e., up to date) data coherency of shared virtual memory while a compute kernel executes on the CA. However, a destination host computer might have a hardware platform that only allows for reliable data coherency after the computer kernel has completed execution, which may take a long time, as described above. In addition, the source host computer might have a hardware platform that uses buffers to pass information between an application running on a virtual machine and the CA. However, the destination host computer might use absolute addressing within system memory to pass information, rendering the received relative addressing within the compute kernel inoperable on the destination host computer.

SUMMARY

The present disclosure provides a method of implementing fine grain data coherency of a shared memory region of a first host computer comprising a central processing unit (CPU), one or more compute accelerators (CAs), an operating system, an application executing within the first host computer, the application comprising a compute kernel, the method comprising: allocating a shared memory region within the first host, the shared memory region being shared by the application and the one or more CAs; locating, within the compute kernel, a data write instruction to the shared memory region; modifying the compute kernel to add a conditional halting point after the located data write instruction; configuring the operating system to suspend execution of the kernel (a) at an interval, or (b) in response to an occurrence of an event; and executing, on the one or more CAs, the compute kernel.

Further embodiments include a non-transitory computer-readable storage medium storing instructions that, when executed by a computing system, cause the computing device to perform the method set forth above, and a computing system programmed to carry out the method set forth above.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure provides an approach for translating between data coherency models for a shared memory region. Data coherence is the up-to-date uniformity of data that is returned when a data access is made to a shared region of memory. Different models or approaches are possible to accomplish data coherency. The approach includes allocating a shared memory region shared by (a) an application within a virtual machine running on a host and (b) a compute accelerator of the host. The translation is from a coarse grain coherency model to a fine grain coherency model. A coarse grain coherency model allows for access to the shared region, by the application, only after a kernel of the workload has completed execution. A fine grain coherency model allows for access to the shared region, by the application, during the course of execution of the kernel. In a fine grain data coherency model, the application does not need to wait for the kernel to complete execution in order to access the results of the kernel's execution.

Figure 1A:
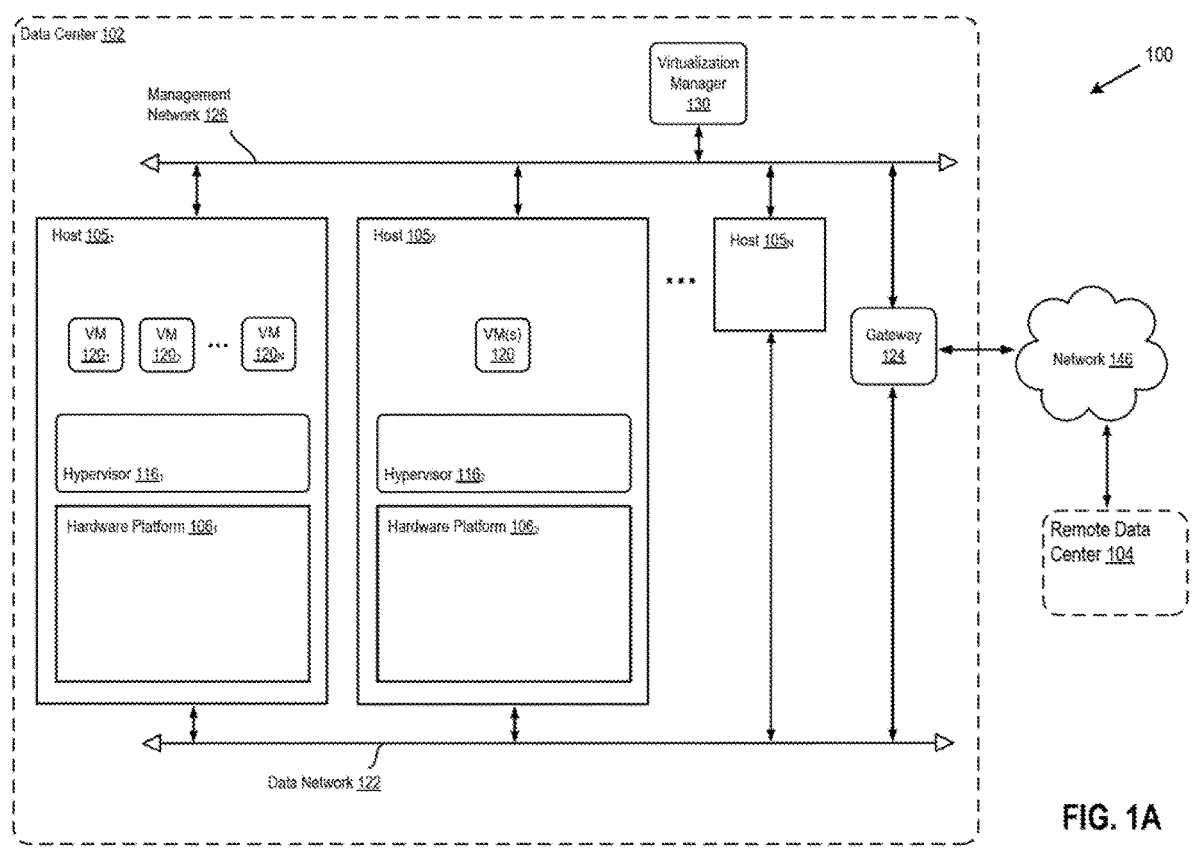
FIG. 1A depicts a block diagram of a computer system in which one or more embodiments of the present disclosure may be utilized, according to an embodiment.

FIG. 1A depicts a block diagram of a computer system 100 in which one or more embodiments of the present disclosure may be utilized, according to an embodiment. As shown, computer system 100 includes data center 102 and a remote data center 104, connected by a network 146. Remote data center 104 may be substantially similar to data center 102. Network 146 may be, for example, a direct link, a local area network (LAN), a wide area network (WAN) such as the Internet, another type of network, or a combination of these.

Data center 102 includes host(s) 105, a virtualization manager 130, a gateway 124, a management network 126, and a data network 122. Each of hosts 105 may be constructed on a server grade hardware platform 106, such as an x86 architecture platform. For example, hosts 105 may be geographically co-located servers on the same rack. Host 105 is configured to provide a virtualization layer or virtualization system/software, also referred to as a hypervisor 116, that abstracts processor, memory, storage, and networking resources of hardware platform 106 into multiple virtual machines $120_1$ to $120_N$ (collectively referred to as VMs 120 and individually referred to as VM 120) that run concurrently on the same host. Hypervisor 116, through abstraction, implements or emulates virtualized components of VM 120, such as a virtual NIC and a virtual CPU 160 (see FIG. 1C). Hypervisor 116 is logically interposed between VMs 120 and hardware platform 106. One example of hypervisor 116 is a VMware ESXi™ hypervisor provided as part of the VMware vSphere® solution made commercially available from VMware, Inc. of Palo Alto, Calif. Hypervisor 116 may run on top of an operating system in host 105 or may itself be the operating system of host 105 and run directly on hardware platform 106 of host 105.

Virtualization manager 130 communicates with hosts 105 via a network, shown as a management network 126, and carries out administrative tasks for data center 102 such as managing hosts 105, managing local VMs 120 running within each host 105, provisioning VMs, migrating VMs from one host to another host, and load balancing between hosts 105. Virtualization manager 130 may be a computer program that resides and executes in a central server in data center 102 or, alternatively, virtualization manager 130 may run as a VM in one of hosts 105. One example of a virtualization manager is the vCenter Server™ product made available from VMware, Inc.

In one embodiment, virtualization manager 130 includes a hybrid cloud management module (not shown) configured to manage and integrate virtualized computing resources provided by remote data center 104 with virtualized computing resources of data center 102 to form a unified computing platform. The hybrid cloud manager module is configured to deploy VMs in remote data center 104, transfer VMs from data center 102 to remote data center 104, and perform other "cross-cloud" administrative tasks. In one implementation, hybrid cloud manager module is a plug-in complement to virtualization manager 130, although other implementations may be used, such as a separate computer program executing in a central server or running in a VM in one of hosts 105. One example of hybrid cloud manager module is the VMware vCloud Connector® product made available from VMware, Inc.

Gateway 124 (e.g., executing as a virtual appliance) provides VMs 120 and other components in data center 102 with connectivity to network 146 used to communicate with remote data center 104. Gateway 124 may manage external public IP addresses for VMs 120 and route traffic incoming to and outgoing from data center 102 and provide networking services, such as firewalls, network address translation (NAT), dynamic host configuration protocol (DHCP), and load balancing. Gateway 124 may use data network 122 to transmit data network packets to hosts 105. Although networks 122 and 126 are shown as separate entities, they may be implemented by shared physical networking components.

Figure 1B:
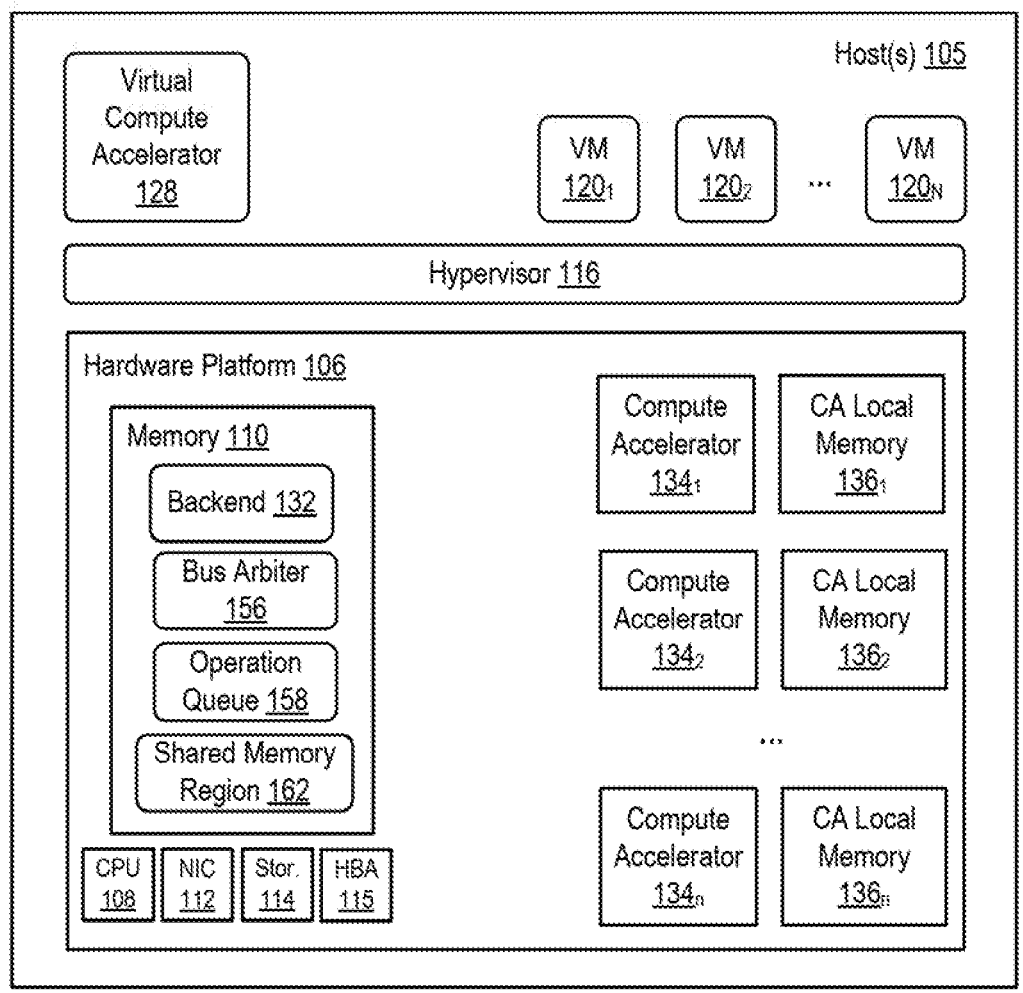
FIG. 1B is an expanded view of a host computer, showing a virtual compute accelerator and extra detail of the hardware platform of the host computer, according to an embodiment.

FIG. 1B is an expanded view of host 105, showing a virtual compute accelerator 128 and extra detail of hardware platform 106, according to an embodiment. Hardware platform 106 of each host 105 may include components of a computing device such as one or more processors (CPUs) 108, system memory 110, a network interface 112, storage system 114, a local host bus adapter (HBA) 115, and other I/O devices such as, for example, a mouse and keyboard (not shown). Hardware platform 106 also includes one or more CAs $134_1$ to $134_N$ (collectively referred to as CAs 134 and individually referred to as CA 134), with each CA having its own local memory 136, the CA local memory 136 typically located on the same compute accelerator card as CA 134.

CPU 108 is configured to execute instructions, for example, executable instructions that perform one or more operations described herein and that may be stored in memory 110 and in storage 114. Network interface 112 enables host 105 to communicate with other devices via a communication medium, such as network 122 or network 126. Network interface 112 may include one or more network adapters, also referred to as Network Interface Cards (NICs). Storage system 114 represents local persistent storage devices (e.g., one or more hard disks, flash memory modules, solid state disks, and/or optical disks). Host bus adapter (HBA) couples host 105 to one or more external storages (not shown), such as a storage area network (SAN). Other external storages that may be used include network-attached storage (NAS) and other network data storage systems, which may be accessible via NIC 112.

System memory 110 is hardware allowing information, such as executable instructions, configurations, and other data, to be stored and retrieved. Memory 110 is where programs and data are kept when CPU 108 is actively using them. Memory 110 may be volatile memory or non-volatile memory. Volatile or non-persistent memory is memory that needs constant power in order to prevent data from being erased. Volatile memory describes conventional memory, such as dynamic random access memory (DRAM). Non-volatile memory is memory that is persistent (non-volatile). Non-volatile memory is memory that retains its data after having power cycled (turned off and then back on). Non-volatile memory is byte-addressable, random access non-volatile memory. In an embodiment, memory 110 includes the software module backend 132. In another embodiment, backend 132 is a module within hypervisor 116. Backend 132 is further discussed with reference to FIG. 1D, below.

Memory 110 includes a bus arbiter 156 and an operation queue 158. Bus arbiter 156 is a device or software module that decides which CPU 108 or CA 134 is allowed to access memory 110 or a region of memory 110 at a given time. Bus arbiter 156 may be a centralized software module or a decentralized software module. Bus arbiter 156 receives data access operations (e.g., read/write operations) to an address within memory 110. Bus arbiter 156 receives data access operations through operation queue 158. In an embodiment, operations are submitted to bus arbiter 156 by either CPU 108 or CA 134. Bus arbiter 156 then places the received operations in to operation queue 158, and then bus arbiter 156 handles operations from operation queue 156 in an order defined by the queue, such as first-in-first-out.

Bus arbiter 156 schedules the operations using a scheduling algorithm known in the art. When bus arbiter 156 receives a data access operation to a shared memory region of memory 110 (e.g., shared memory region 162) by a first processor (e.g., CPU 108 or CA 134), and shared memory region 162 is being used by a second processor, bus arbiter 156 may allow access to shared memory region 162 by the first processor before the second processor has completed use of shared memory region 162, or bus arbiter 156 may block access to shared memory region 162 by the first processor until a later time, such as when the second processor has finished using shared memory region 162.

If bus arbiter 156 allows the first processor access to shared memory region 162 before the second processor has completed use of that region, hardware platform 106 may be configured such that all write operations entered into operation queue 158 prior to the data access request by the first processor are completed before executing the data access request by the first processor. That is, shared memory region 162 may be updated with all writes sent to shared memory region 162 prior to allowing access to the region, so that the access is to the most up-to-date state of shared memory region 162. Alternatively, if bus arbiter 156 allows the first processor access to shared memory region 162 before the second processor has completed use of that region, hardware platform 106 may be configured such that the data access request by the first processor is executed prior to executing previous data write operations to shared memory region 162.

Shared memory region 162 may be shared by CA 134 and VM 120 on which application 140 (see FIG. 1C) executes. In an embodiment, shared memory region 162 is shared only by VM 120 and CA 134. Shared memory region 162 may be shared between (a) CPU 108 or a virtual CPU (vCPU) 160 (see FIG. 1C) of a VM 120, and (b) CA 134 or a virtual CA (vCA) 128, which may be running within a VM 120. For example, a memory region shared between vCPU 160 and vCA 128 is a memory region that is also shared between (a) one or more physical CPUs 108 that correspond to the vCPU 160, and (b) one or more physical CAs 134 that correspond to the vCA 128. In an embodiment, each of the following components of computer system 100 may have access to shared memory region 162: CPU 108, vCPU 160, application 140, VM 120, CA 134, and vCA 128. Shared memory region 162 may be accessed by vCPU 128 and CPU 108 through a memory management unit (MMU) on CPU 108. Shared memory region 162 may be accessed by vCA 128 through executing kernel 142 on CA 134.

Hardware platform 106 includes one or more CAs 134, with each CA 134 having its own local memory 136, the CA local memory 136 typically located on the same compute accelerator card as CA 134. CA 134 is a specialized type of processor that performs certain specialized mathematical calculations much faster than CPU 108. CA 134 may be, for example, a GPU, FGPA, or DSP. CA 134 may be a peripheral device that accelerates mathematical operations, submitted through compute kernel 142 (see FIG. 1C) by application 140 run on CPU 108. CA 134 is programmed through a CA API (e.g. OpenCL, DirectCompute, Vulkan, Metal) to give application 140 a high-level interface for submitting compute kernel 142 for execution on a particular working set. CA 134 may have many, e.g., hundreds or thousands, of processor cores (not shown). Each core of CA 134 may execute, in parallel, a piece of code called a compute kernel, further discussed below with reference to FIG. 1C. Each CA 134 may communicate with system memory 110 through a connection such as a peripheral component interconnect express (PCIe) bus, which is managed by bus arbiter 156. In an embodiment, connection between each CA 134 and system memory 110 is relatively slower than the connection between each CA 134 and its respective CA local memory 136. In another embodiment, CA 134 may be integrated within CPU 108, allowing CA 134 to access system memory 110 at a substantially equal speed as accessing CA local memory 136.

Some notable differences between CA 134 and CPU 108 are as follows. CA 134 is capable of executing kernel 142 faster and more efficiently than CPU 108. CA 134 usually executes workloads submitted through a command queue and threading is an implied characteristic of the CA programming model. However, threading on CPU 108 usually must be explicitly programmed. For example, architecturally, CPU 108 is composed of just few cores with lots of cache memory that can handle a few software threads at a time. In contrast, CA 134 may be composed of hundreds of cores that can handle thousands of threads simultaneously. CA 134 is programmed through CA APIs, and does not execute CPU instruction sets or operating system binaries or machine code. Internal state of CA 134 is therefore not visible to a compute kernel 142 (see FIG. 1C) or application 140 (see FIG. 1C), whereas instruction sets of CPU 108 expose significant portions of internal state of CPU 108 to higher privilege CPU modes.

Further, CA 134 applies a set of algorithms (written in compute kernels) to a working set for generating a result. CA 134 does not manage active binaries of an operating system stack and does not interact with operating system services (e.g., a file system). CPU 108 controls the execution flow of an operating system, while CA 134 does not; that is, CPU 108 does not spawn processes from compute kernel 142 or throw interrupts. CA 134 has dedicated local memory 136 that is different from local memory of CPU 108 (i.e., system memory 110). When CA 134 performs an out-of-bounds read, the returned value is usually a predetermined default value for the API of CA 134, whereas CPU 108 would throw an exception that must be handled. CA 134 relies on CPU 108 to submit compute kernel 142 to CA 134. Also, CA 134 is a specialized processor, so CA 134 may have a reduced instruction set compared to CPU 108. A reduced instruction set reduces the attack surface of a processor, making CA 134 more secure and more able to withstand malicious attacks, as compared to CPU 108.

FIG. 1B also shows virtual CA 128 running as a software module on host 105. Virtual CA 128 abstracts CAs 134 into a single device visible to applications that are running on VM 120 or host 105. That is, host 105 may have several physical CAs 134 available for CA workloads, but the CAs 134 may be abstracted so that an application sees only one CA device available to it on host 105. The abstraction of multiple CAs 134 into a single virtual device is accomplished by virtual CA 128. Virtual CA 128 manages division of work required by an application among physical CAs 134, as further explained with reference to FIG. 1D, below.

Figure 1C:
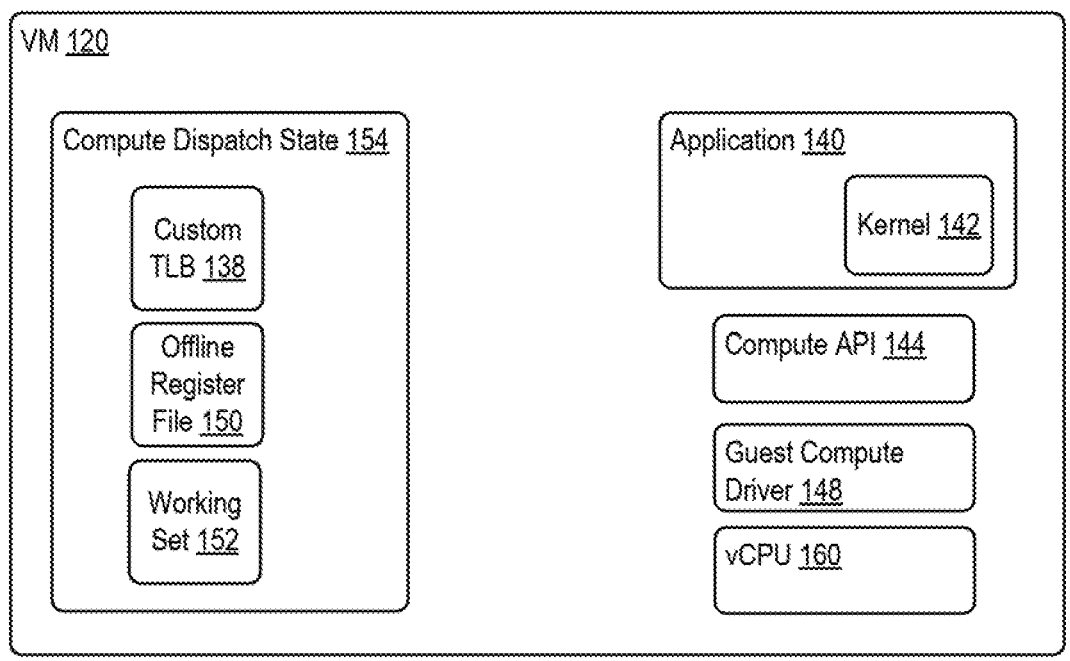
FIG. 1C depicts a block diagram of a virtual machine, showing software modules executing on the virtual machine and data files maintained by the virtual machine for execution of a CA workload, according to an embodiment.

FIG. 1C depicts a block diagram of a VM 120, showing software modules executing on VM 120 and data files maintained by VM 120 for execution of a CA workload, according to an embodiment. The software modules are shown on the right and include application 140, kernel 142, compute application programming interface (API) 144, and guest compute driver 148. The data files are shown on the left and include custom TLB 138, offline register file 150, and working set 152. Custom TLB 138, offline register file 150, and working set 152 comprise compute dispatch state 154. Compute dispatch state 154 is a subset of the compute state at the point of dispatch or start of execution of compute kernel 142. Compute dispatch state 154 is programmed by application's 140 usage of the CA API. Compute dispatch state 154 comprises or consists of the active working set 152, the references to memory backing or containing the working set (e.g., references within custom TLB 138), and the CA configuration (not shown) to be used during execution of compute kernel 142. As used herein, the term "dispatch" may mean the start of execution of kernel 142 on CA 136. The data files and software modules may be located in the portion of system memory 110 reserved for VM 120. Application 140, compute API 144, and guest compute driver 148 are running on CPU 108. At the time of execution of kernel 142, kernel 142 may be present within CA local memory 136 and executing on CA 134.

VM 120 includes application 140. Application 140 may be any type of application designed for any purpose. As part of its execution, application 140 has a function or module that is designed to run on CA 134. The function or module is compute kernel 142. Compute kernel 142 is a small set of functions that acts on an input (e.g., a working set) and contributes to an output. Compute kernel 142 is isolated to execution on CA 134 for the purpose of accelerating certain tasks required by application 140 running on CPU 108. An instance of compute kernel 142 is typically a thread. An instance of compute kernel 142 (e.g., a thread) cannot spawn threads, processes, or throw interrupts. On the other hand, application 140 running on CPU 108 may spawn threads, processes, or throw interrupts.

For example, the application 140 may be a financial calculator that has a neural network component. As part of the boot process of host 105, the financial calculator may open and then train a neural network on the latest financial data retrieved from the internet that morning. The training of the neural network may be accomplished by compute kernel 142 of application 140. The neural network may be trained on a data file, which is shown as working set 152 in FIG. 1C. Working set 152 is the data on which compute kernel 142 performs its operations. For example, working set 152 may contain the latest financial data to train a neural network, or it may contain a matrix for transposition. In an embodiment, compute kernel 142 may be executed on CPU 108, but is designed to preferably be executed on CA 134.

If memory 110 supports the use of buffers or absolute memory addressing during execution of kernel 142, then working set 152 may comprise one or more data objects contained in one or more buffers. Whether memory 110 supports the use of buffers or absolute addressing may be determined by, for example, compute API 144 (see below) or a compute API used by CA 134 (see "target API" described with reference to FIG. 1D below). In an embodiment, the use of relative addressing within buffers is the default addressing method implemented by compute API 144 for CA 134 and vCA 128. The use of absolute addressing may require a compute API 144 that allows CA 134 to read data from a cache (not shown) of CPU 108, and examples of such an API 144 include the Metal API or the Advanced eXtensible Interface (AXI) Coherency Extensions Lite (ACE-Lite) API.

A data object may be, for example, a linked list. If memory 110 supports the use of buffers, then data within a data object of the working set may be accessed with relative addressing within kernel 142. For example, data may be accessed using a buffer identifier and a position number of that buffer, such as "data buffer[0]" for data within the first position of a buffer identified as "data buffer."

If memory 110 does not support the use of buffers during execution of kernel 142, then working set 152 may comprise one or more data objects whose data is accessed using absolute addressing, such as virtual address "0x098FD000" written in hexadecimal format.

Compute API 144 is an API exposed to application 140 to communicate with CA 134, or with what application 140 perceives as the available CA, such as virtual CA 128. Compute API 144 may be a standard compute accelerator API known in the art, such as OpenCL, DirectCompute, CUDA, or Vulkan. Compute API 144 may also be a proprietary API. Compute API 144 works together with guest compute driver 148 to communicate with virtual CA 128. That is, guest compute driver 148 may be a plug-in to compute API 144, the plugin allowing the standard compute API 144 to work with a virtualized compute accelerator rather than a physical CA. In an embodiment, guest compute driver 148 is a software module located in hypervisor 116.

VM 120 also includes offline register file 150 and optionally, custom TLB 138. Offline register file 150 is used to store values of variables of kernel 142 after suspending a CA workload, and thereafter, to restore the values of variables of kernel 142 upon a resume of the CA workload. The variable values allow a CA workload to resume at a later time from the point of execution at which the workload was suspended. Custom TLB 138 stores translations of select virtual addresses (VAs) from operating system of VM 120 to VAs of operating system of host 105. During execution of kernel 142 on CA 134, offline register file 150 may be accessible to both CPU 108 and CA 134. During execution of kernel 142 on CA 134, offline register file 150 may be located on CA local memory 136. Offline register file 150 and custom TLB 138 are discussed in further detail below with reference to FIG. 3 and FIG. 4, respectively.

As stated above, shared memory region 162 may be shared between (a) CPU 108 or vCPU 160 of a VM 120, and (b) CA 134 or vCA 128. Shared memory region 162 may contain, for example, some or all of working set 152 being used by kernel 142, and some or all of the results of execution of kernel 142.

Shared memory region 162 that is reserved for use by vCA 128, may have different data coherency models. A data coherency model is a technique that determines at what frequency data writes by vCA 128 or its corresponding CA(s) 134 to shared memory region 162 are visible to and accessible by the vCPU 160 with which memory region 162 is shared. In a "coarse grain" data coherency model, data written by vCA 128 (or by associated CA 134) to shared memory region 162 is reliably accessible to vCPU 160 only after completion of execution of kernel 142 on associated CA 134. "Completion" may mean that all iterations of loop(s) within kernel 142 have executed and that all instructions within kernel 142 that write to shared memory region 162 have been executed by CA 134. After completion of execution of kernel 142, a "flush" and "complete" command is automatically executed by bus arbiter 156, executing and flushing all write operations that are within operation queue 158 and that originated from CA 134. Before completion of execution of kernel 142, some or all data written to shared memory region 162 by CA 134 may be located outside of shared memory region 162, such as within a data queue (not shown) managed by bus arbiter 156. After completion of execution of kernel 142, all data written to shared memory region 162 by CA 134 is located or will shortly be located within shared memory region 162.

In a "fine grain" data coherency model, all or substantially all data written by vCA 128 (or by associated CA 134) to shared memory region 162 is actually located within the shared memory region 162 before completion of execution of kernel 142, and is reliably accessible to vCPU 160 (such as by application 140 that is running on vCPU 160) before completion of execution of kernel 142. For example, in a "fine grain" data coherency model, data written by vCA 128 (or by associated CA 134) to shared memory region 162 may be accessible to vCPU 160 on a "per-instruction" level. That is, upon execution of the write instruction within kernel 142 to shared memory region 162, the written data is visible and accessible by vCPU 160 before execution of the next instruction within kernel 142.

A data coherency model may be implemented as coarse grain or fine grain by a combination of (a) compute API used by CA 134 (see "target API" described with reference to FIG. 1D below), (b) scheduling of execution of data write operations by bus arbiter 156, and optionally (c) other components of host 105, such as hardware components of hardware platform 106. That is, compute API of CA 134 may be such that CA 134 sends data write operations to shared memory region 162 frequently for fine-grain data coherency or infrequently for coarse-grain data coherency, and bus arbiter 156 may execute and flush the data write operations, likewise, frequently or infrequently. Alternatively, a fine grain data coherency model may be implemented via software, as described in FIG. 6 below.

Figure 1D:
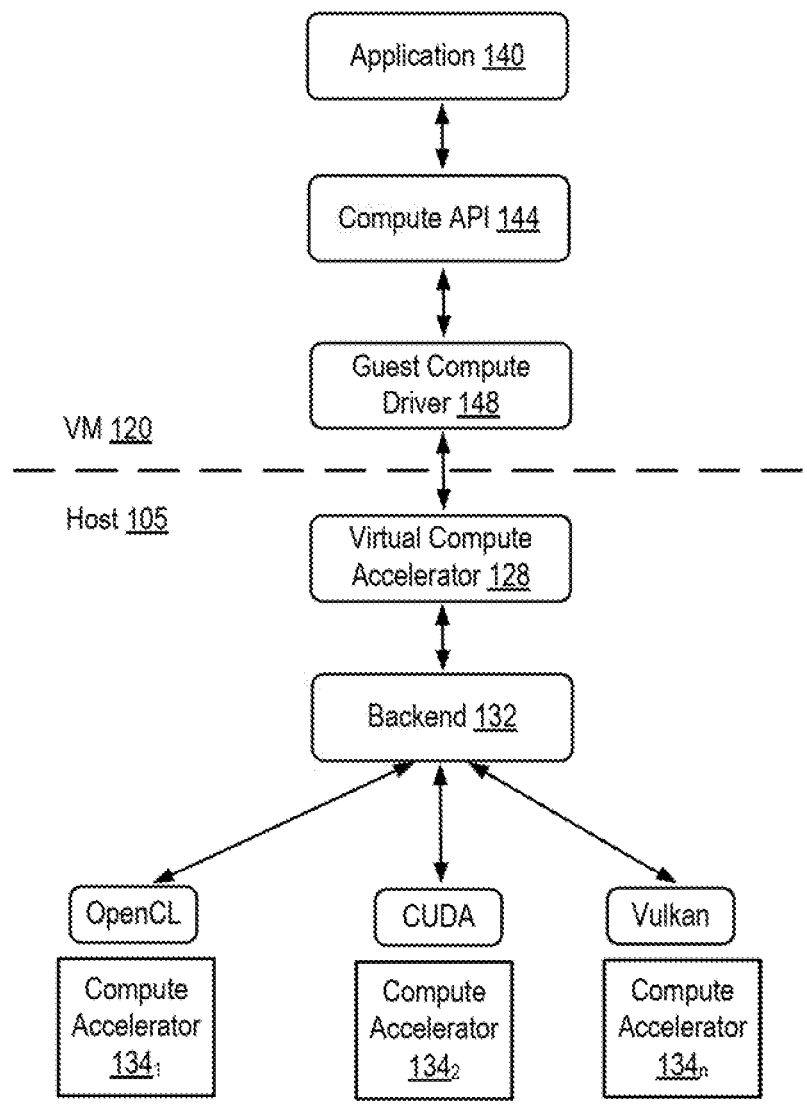
FIG. 1D depicts a block diagram of a data flow between a guest application and one or more compute accelerators, according to an embodiment.

FIG. 1D depicts a block diagram of a data flow between a guest application 140 and physical CAs 134 running on host 105, according to an embodiment. Application 140 is a "guest" application because it is running on VM 120, which is a guest machine on host computer 105. The data flow shown in FIG. 1D illustrates the abstraction and/or virtualization of CA 134, so that application 140 perceives a single compute accelerator device with which it can communicate using a single compute accelerator API. Application 140 may send a command to what it perceives to be a physical CA 134, and that command may be, for example, to reserve a certain amount of CA local memory 136 for the execution of a CA workload.

A command from application 140 will be transmitted to compute API 144, and the command may be formatted in a way recognizable by compute API 144. Compute API 144 may also keep a list of active elements of the working set and perform semantic checks on the incoming command. Compute API will then transmit the command to guest compute driver 148. Guest compute driver 148 modifies the command as needed to work with virtual CA 128. For example, guest compute driver 148 may translate between compute API 144 to the protocol of virtual CA 128, if the two protocols are different or if the command format is not support by virtual CA 128. Guest compute driver 148 may also translate working set element names from compute API 144 to the elements' associated names on virtual CA 128.

Virtual CA 128 interprets the command and divides up the request among CAs 134 available on host 105. For example, in preparation for executing kernel 142 on several CAs 134 of host 105, virtual CA 128 may replicate the command and transmit one to each CA 134 available on host 105. The replication may result in a reservation of memory on each of CA local memory $136_1$ to $136_N$. If the command had been, for example, to set up compute kernel 142, then virtual CA 128 may divide up the anticipated CA workload evenly between physical CAs 134, such as by assigning a portion of working set 152 to each CA 134. For example, for a transpose operation on a matrix to be performed on four CAs 134, virtual CA 128 may divide up CA workload such that each CA 134 executes kernel 142 on one-fourth of the matrix. Afterwards, CA 128 may combine the results of each CA 134 that performed the transpose workload into a single results/solution matrix.

In an embodiment, application 140 may send all commands needed to start and complete a CA workload in a command buffer, which may be a queue from which commands are extracted and executed in a first-in-first-out (FIFO) order. Such a command buffer may be received by virtual CA 128. Virtual CA 128 extracts each command in the buffer one by one, analyzes, divides up between CAs 134 as needed, and transmits to backend 132 for protocol translation.

Commands from virtual CA 128 are transmitted to backend 132. Backend 132 is a protocol translator. Each of CAs 134 available on host 105 may be of a different type and architecture, originating from a different manufacturer, and using a different CA API. Rather than requiring application 140 or virtual CA 128 to issue or retransmit commands in different APIs, all commands are initially formatted as required by compute API 144 until they are optionally translated into the CA API of virtual CA 128 by guest compute driver 148, and then again translated to CA API of each CA 134 by backend 132.

When backend 132 receives a command from virtual CA 128, backend 132 then analyzes the command, compares the format of the command to the API of the destination CA 134, and if the formats do not match, backend 132 translates the command from compute API 144 into the target API. The target API may be, for example, OpenCL, CUDA, Vulkan, DirectCompute, or a proprietary API. One example of a protocol translator is the VMware vSGA product made available from VMware, Inc. Protocol translation may be accomplished by methods known in the art, such as the method described in "GPU Virtualization on VMware's Hosted I/O Architecture," by Micah Dowty and Jeremy Sugerman, published in 2008.

Each CA 134 that is to execute CA workload of kernel 142 may receive an instruction from virtual CA 128 to perform only a portion of the CA workload of kernel 142. Upon receiving kernel 142 and working set 152, each CA 134 may further subdivide its portion of CA workload among its many compute cores. In an embodiment, each CA 134 is its own thread, with each thread having a thread ID assigned by CA 134. In another embodiment, each computing core of CA 134 is its own thread, with each thread having a thread ID assigned by CA 134.

Figure 2:
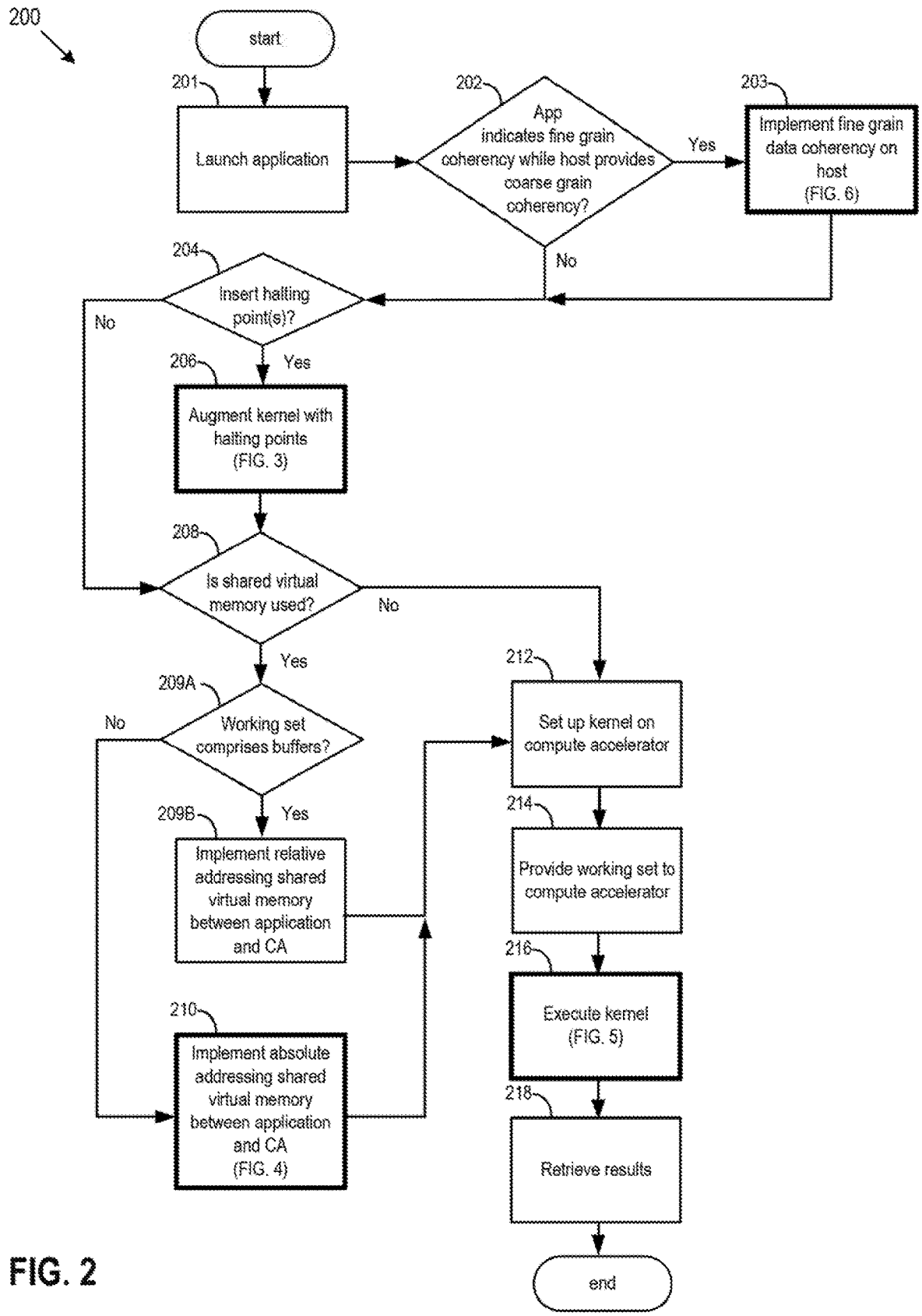
FIG. 2 depicts a flow diagram of a method of executing a compute accelerator workload that is capable of being suspended before completion and resumed at a later time, according to an embodiment.

FIG. 2 depicts a flow diagram of a method 200 of performing a compute accelerator workload that is capable of being suspended before completion and resumed at a later time, according to an embodiment. Method 200 describes a way of performing a CA workload that allows a user or a program to pause the workload in the middle of its execution and then to resume the workload from the point at which it was stopped. Such an approach is advantageous because it avoids the need to start a CA workload from the beginning if the workload must be stopped for any reason. This approach allows scheduling of higher priority CA workloads while a low priority CA workload is running, and migration of a CA workload between hosts for load balancing or fault tolerance. Steps 201 through 210 are performed by CPU 108, while steps 212, 214 and 218 are performed by both CPU 108 and CA 134 working together. In an embodiment, step 216 is performed solely by CA 134. In another embodiment, step 216 is performed by both CPU 108 and CA 134, meaning that kernel 142 executes on both CA 134 and CPU 108.

At step 201, application 140 is launched by CPU 108. The launching may be done, for example, by double clicking a shortcut on a desktop by an administrator, with the clicking operation being processed and executed by CPU 108. Alternatively, application 140 may be launched automatically, such as by a call to CPU 108 from another application or as part of a boot process of host computer 105. Application 140 includes compute kernel 142, designed to be executed on CA 134.

At step 202, application 140 determines whether application 140 is to access shared memory region 162 between application 140 (e.g., vCPU 160) and vCA 128 or CA 134 before completion execution of kernel 142. If so, this indicates that application 140 is implemented for fine grain data coherency between application 140 and vCA 128 or CA 134. Application 140 then determines whether hardware platform 106 of host 105 supports fine grain data coherency. If so, then both application 140 and host 105 support fine grain data coherency in shared memory region 162, and method 200 skips step 203 and continues to step 204. If host 105 does not support fine grain data coherency, then method 200 continues to step 203, at which fine grain data coherency is implemented on host 105, as described with reference to FIG. 6.

Figure 6:
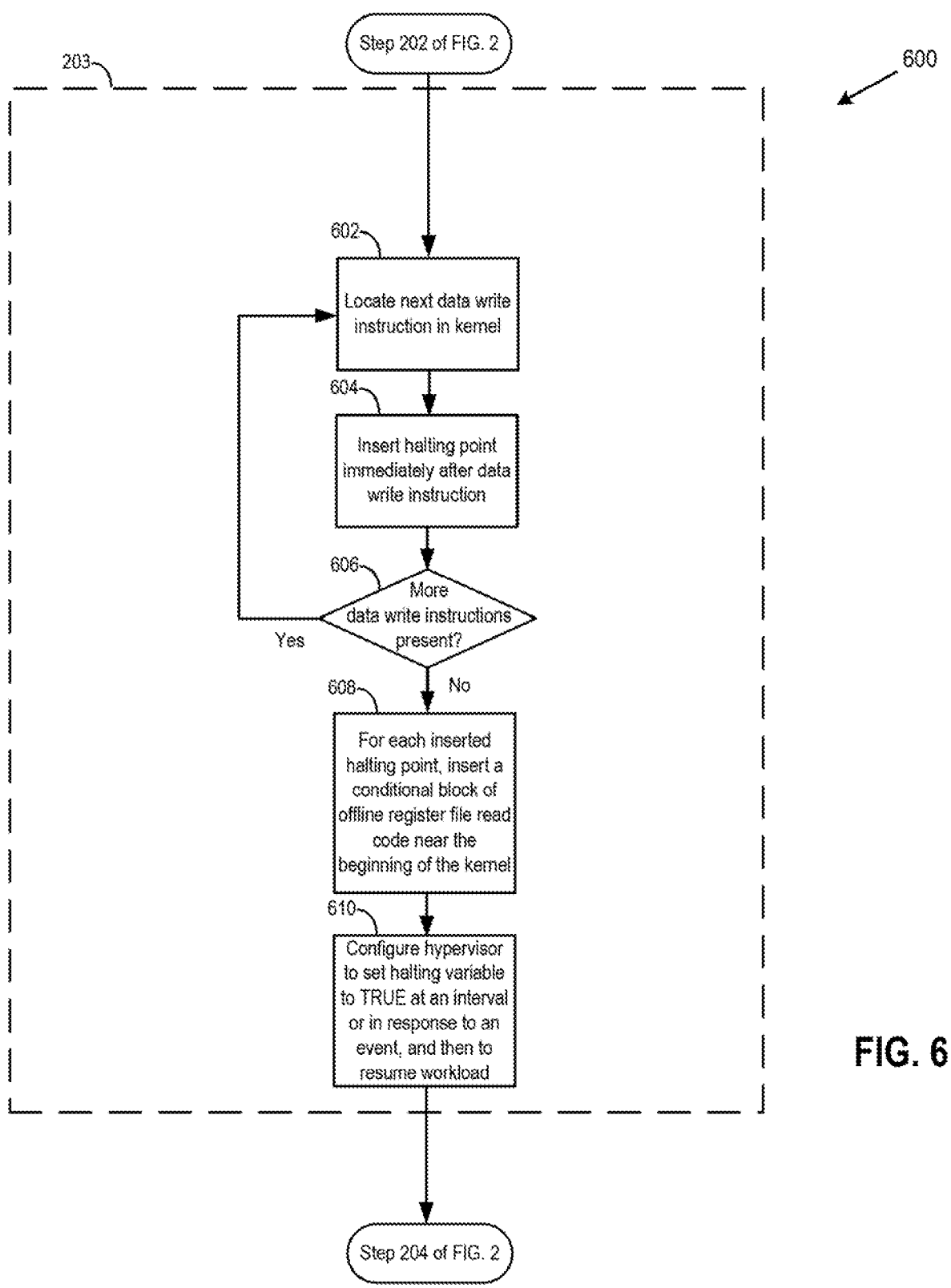
FIG. 6 depicts a flow diagram of a method of implementing fine grain data coherency for a shared memory region of a host computer, according to an embodiment.

FIG. 6 depicts a flow diagram of a method 600 of implementing fine grain data coherency for shared memory region 162, according to an embodiment. Method 600 is an expanded view of step 203 of FIG. 2. In an embodiment, method 600 is performed by backend 132 before backend 132 translates a command containing a reference to kernel 142 to the API of CA 134. In another embodiment, method 300 is performed by application 140 or by another application that scans executing applications for the presence of kernel 142 and then augments kernel 142 if needed. Step 610 may be performed by hypervisor 116.

For clarity of explaining method 600, the below pseudocode for an exemplary kernel will be used as kernel 142 for illustrating the steps of method 600. The exemplary kernel (kernel 142) finds the transpose of matrix A and stores the solution in matrix B.

---
Code Segment 1A
---

```
kernel_transpose(matrix A, matrix B)
{
    thread_id = get_global_id( );
    int row, col;
    for (row = 0; row < A.rows; row++)
    {
        for (col = 0; col < A.cols; col++)
        {
            B[col][row] = A[row][col];
        }
    }
}
```

At step 602, kernel 142 is scanned from beginning to end to locate the first or next data write instruction within kernel 142. The data write instruction may be to the region 162 of memory 110 shared between vCPU 160 (corresponding to application 140) and vCA 128 or CA 134. The only data write instruction in exemplary kernel 142 shown in Code Segment 1A is "B [col] [row]=A [row] [col];", so this instruction is located within exemplary kernel 142.

At step 604, a conditional halting point is inserted after or immediately after the data write instruction. A "halting point" or "conditional halting point," as used herein, includes three elements, each of which is explained further below: (1) a bookmark (e.g., a program counter) within offline register file 150, (2) a label within kernel 142, and (3) a halting predicate, which is a block of code that executes conditionally depending on the value of a halt variable.

After insertion of a conditional halting point at step 604, the exemplary kernel appears as follows, with the bolded lines showing the newly-added lines of code.

| Code Segment 1B |
|---|
| ```
kernel_transpose(matrix A, matrix B)
{
    thread_id = get_global_id( );
    int row, col;
    for (row = 0; row < A.rows; row++)
    {
        for (col = 0; col < A.cols; col++)
        {
            B[col][row] = A[row][col];
            // halting point 1
            registerFile[thread_id * MAX_REGISTERS + BOOKMARK_OFF-
            SET]
            = 1;
            halting_point_label1:
            if(registerFile[thread_id * MAX_REGISTERS + HALT_OFFSET]
            == TRUE)
            {
                // write kernel variables and halting point number
                // to offline register file
                return;
            }
        }
    }
}
``` |

The value of the bookmark variable within offline register file 150 is set by the first bolded line in the exemplary kernel above, specifically by the line "registerFile[thread_id*MAX_REGISTERS+BOOKMARK_OFFSET]=1". Offline register file 150 is shared by all threads executing kernel 142. Therefore, each thread may only use a portion of offline register file 150, and each thread is configured not to overwrite data specific to other threads that are executing kernel 142.

An index within offline register file 150 is calculated by adding the bookmark offset to the point in offline register file 150 where data for thread_id begins. The point where data for thread_id begins within offline register file 150 is calculated by multiplying thread_id by MAX_REGISTERS. MAX_REGISTERS is the number of registers or saved variables, per thread, in compute kernel 142. It should be noted that at the time of execution of kernel 142, a copy of offline register file 150 may be placed within CA local memory 136 of each CA 134 executing the kernel. This will allow fast access to offline register file 150 by each CA 134. Due to multiple copies of offline register file 150 being located at the various CA local memories 136, virtual CA 128 may implement a synchronization/coherence mechanism that resolves conflicts, at required time points, between data within the various copies of offline register file 150 present among CA local memories 136.

The first bolded line above, "registerFile [thread_id*MAX_REGISTERS+BOOKMARK_OFFSET]=1", sets the bookmark value within offline register file 150 to "1," which means that the data that is stored within offline register file 150 for the thread with id of "thread_id" pertains to halting point 1 within kernel 142. As used herein, the term "bookmark value" means value of the bookmark variable being discussed. If, for example, kernel 142 is suspended at halting point 1 (as shown created above in Code Segment 1B), then upon resuming kernel 142, the application managing the resume operation will know that the data for thread of thread_id pertains to the portion of kernel 142 marked by halting point 1. It should be noted that by default, bookmark value within offline register file 150 is zero.

The second bolded line of Code Segment 1B above, "halting_point_label1:", creates a label within kernel 142 for halting_point 1. When kernel 142 is resumed after having been halted at halting_point 1, kernel 142 jumps to the label of the halting_point at which the CA workload or kernel 142 was suspended. The jump or "goto" instruction is inserted into kernel 142 in step 608 of method 600, below.

The rest of the bolded lines of Code Segment 1B represent the halting predicate. The halting predicate begins with a conditional statement in the form of an if-statement: "if (registerFile[thread_id*MAX_REGISTERS+HALT_OFFSET]==TRUE)". The conditional statement tests whether the halt variable within offline register file 150 has been set to true. If so, that means that a suspend command for this CA workload has been issued, such as by a system administrator, application 140 or by another application, or hypervisor 116. Although the indexing into offline register file 150 in the above line is written as though a separate halt variable exists for each thread executing kernel 142, the halt variable may instead be a single variable stored at a single location of offline register file 150. In an embodiment in which a separate halt variable exists for each thread executing kernel 142, a suspend/resume command changes all halt variable values within offline register file 150, for all threads executing kernel 142.

At the time of execution of kernel 142, if the above conditional line of the halting predicate evaluates to true, then all variable values of kernel 142 are written to offline register file 150 and CA workload of kernel 142 is suspended, to be resumed later. For example, in the exemplary kernel of Code Segment 1B, the values of variables "row" and "col" would be recorded within offline register file 150. The "return" line within the halting predicate causes kernel 142 to cease execution.

At step 606, kernel 142 is scanned to determine whether additional data write instructions are present within kernel 142. If so, then method 600 returns to step 602 and repeats step 602 and 604 for the next data write instruction. If not, then method 600 continues to step 608.

At step 608, the beginning of kernel 142 is modified for the purpose of a resume operation on kernel 142. Stopping or halting execution of kernel 142 causes bus arbiter 156 to execute a "flush" and "complete" command, which executes and flushes all write operations that are within operation queue 158 and that originated from CA 134. The flush and complete operations bring shared memory region 162 of vCPU 160 and CA 134 up to date, so that when an application (e.g., application 140) accesses shared memory region 162, such as to obtain data from the results of execution of kernel 142, the most recently computed data is present in shared memory region 162. When resumed, CA workload of kernel 142 begins at the same point of execution at which kernel 142 stopped. To accomplish this, variable values of kernel 142 are read from offline register file 150, and then execution of kernel 142 jumps to the halting point label within the code of kernel 142 at the halting point at which execution was suspended.

At step 608, for each halting point inserted in kernel 142, a read predicate is inserted for reading in values of variables of kernel 142, and for jumping to the appropriate line of code of kernel 142. For the purpose of step 608, a halting point is counted only once for each appearance in kernel 142, with loops remaining in a "rolled" state. That is, if a loop contains one halting point and the loop is executed one-hundred times, the halting point counts as a single halting point within kernel 142, not as one-hundred halting points.

Code Segment 1C below shows the addition of one read predicate, one for each halting point within the example kernel. The newly added read predicate is shown in bold font. In an embodiment, the read predicate is added to the beginning of kernel 142 before the halting point with which the read predicate is associated, at a point of kernel 142 that comes after reading in a thread id and after declaration of at least some variables of kernel 142.

suspended at a halting point, then upon a resume launch of kernel 142, the value of the bookmark variable within offline register file 150 will be equal to the value of the halting point at which kernel 142 was suspended (a non-zero value). Within the body of the code of read predicate 1, value of variables of kernel 142 (e.g., row, col) will be read in from offline register file 150, and execution of kernel 142 (or exemplary kernel) will jump to halting_point_label1, which is a label present at the beginning of the second for-loop and within halting_point 1. When the execution of kernel 142 jumps to halting_point_label1, the "row" and "col" variables are not initialized to zero, but instead, the variables retain the values that had been set within read predicate 1 from offline register file 150 before jumping to halting_point_label1.

At step 610, hypervisor 116 is configured to set halt variable within offline register file 150 to true at a cycle or interval of time or an interval of cycles of CPU 108, or in response to an occurrence of an event. The interval may be, for example, 5, 15, 50, or 100 cycles of CPU 108. That is, if the interval is 15 cycles, then every 15 cycles, hypervisor 116 sets the halt variable within offline register file 150 to true, and every 15 cycles, execution of kernel 142 is halted, causing shared memory region 162 to be updated with write operations that are within operation queue 158. The interval may be, for example, 1, 2, 5, 10, or 100 milliseconds. As part of step 610, hypervisor 116 or application 140 may be configured to restart or resume execution of kernel 142 immediately after the halt.

Hypervisor 116 may be configured to halt execution of kernel 142 in response to an event, such as a data access Code Segment 1C

```
kernel_transpose(matrix A, matrix B)
{
    thread_id = get_global_id( );
    int row, col;
    // read predicate 1
    if (registerFile(thread_id * MAX_REGISTERS + BOOKMARK_OFFSET] ==
    1)
    {
        // read kernel variables from offline register file
        goto halting_point_label1;
    for (row = 0; row < A.rows; row++)
    {
        for (col = 0; col < A.cols; col++)
        {
            B[col][row] = A[row][col];
            // halting point 1
            registerFile[thread_id * MAX_REGISTERS + BOOKMARK_OFFSET]
            = 1;
            halting_point_label1:
            if(registerFile[thread_id * MAX_REGISTERS + HALT_OFFSET]
            == TRUE)
            {
                // write kernel variables and halting point number
                // to offline register file
                return;
            }
        }
    }
}
```

As shown, each read predicate first checks the value of the bookmark variable within offline register file 150. Upon initial launch of kernel 142, before a suspend operation, the default value of the bookmark variable within offline register file 150 is zero or false. Upon initial launch of kernel 142, the if-statement at the beginning of each read predicate will evaluate to false because the bookmark variable will have a value of zero. However, if kernel 142 had been previously request by vCPU 160 for data from shared memory region 162. Hypervisor 116 may mark all memory pages assigned to shared memory region 162 as "write only" within page table entries of one or more page tables managed and/or maintained by hypervisor 116. The page tables maintained by hypervisor 116 may be separate page tables from those maintained by host 105. The page tables may be used to translate a guest virtual address to a host physical address.

For example, the page tables maintained by hypervisor 116 may be used to translate a guest virtual address to either a guest physical address or a host virtual address, while the page tables maintained by host 105 may be used to translate a host virtual address to a host physical address.

When hypervisor 116 receives a data access request by vCPU 160 to a memory page assigned to shared memory region 162 marked as "write only," a page fault occurs. Hypervisor 116 handles the page fault by setting the halt variable within offline register file 150 to true, halting executing of kernel 142. After execution is halted and shared memory region 162 is up to date with all pending writes made to shared memory region 162 by CA 134, then hypervisor 116 sends the data access request by vCPU 160 to bus arbiter 156 by placing the data access request into operation queue 158. Afterwards, hypervisor 116 or application 140 resumes execution of kernel 142, as described in FIG. 5 below. Optionally, before resuming execution of kernel 142, the CA workload of kernel 142 is migrated to another host 105.

Returning to FIG. 2, at step 204, a determination is made as to whether kernel 142 should be augmented with conditional halting points that allow a CA workload to be suspended and then restarted. If step 204 is reached from step 203, then step 204 may be regarded as a determination of whether to add additional halting points to kernel 142, because halting points have already been added at step 203. The determination at step 204 may be accomplished by querying a user or administrator regarding whether the CA workload of application 140 should have suspend/resume capabilities. The determination may also be accomplished by analyzing kernel 142 and its working set 152 to estimate duration of CA workload, and then subsequently augment kernel 142 if the estimated duration is above a threshold. The querying of a user or the analysis of kernel 142 may be performed by application 140 via CPU 108, or it may be performed by another application that scans executing applications for the presence of kernel 142 and performs kernel augmentation, if needed. If conditional halting points are to be inserted into kernel 142, then method 200 proceeds to step 206. If conditional halting points are not to be inserted into kernel 142, then method 200 skips step 206 and proceeds to step 208.

Figure 3:
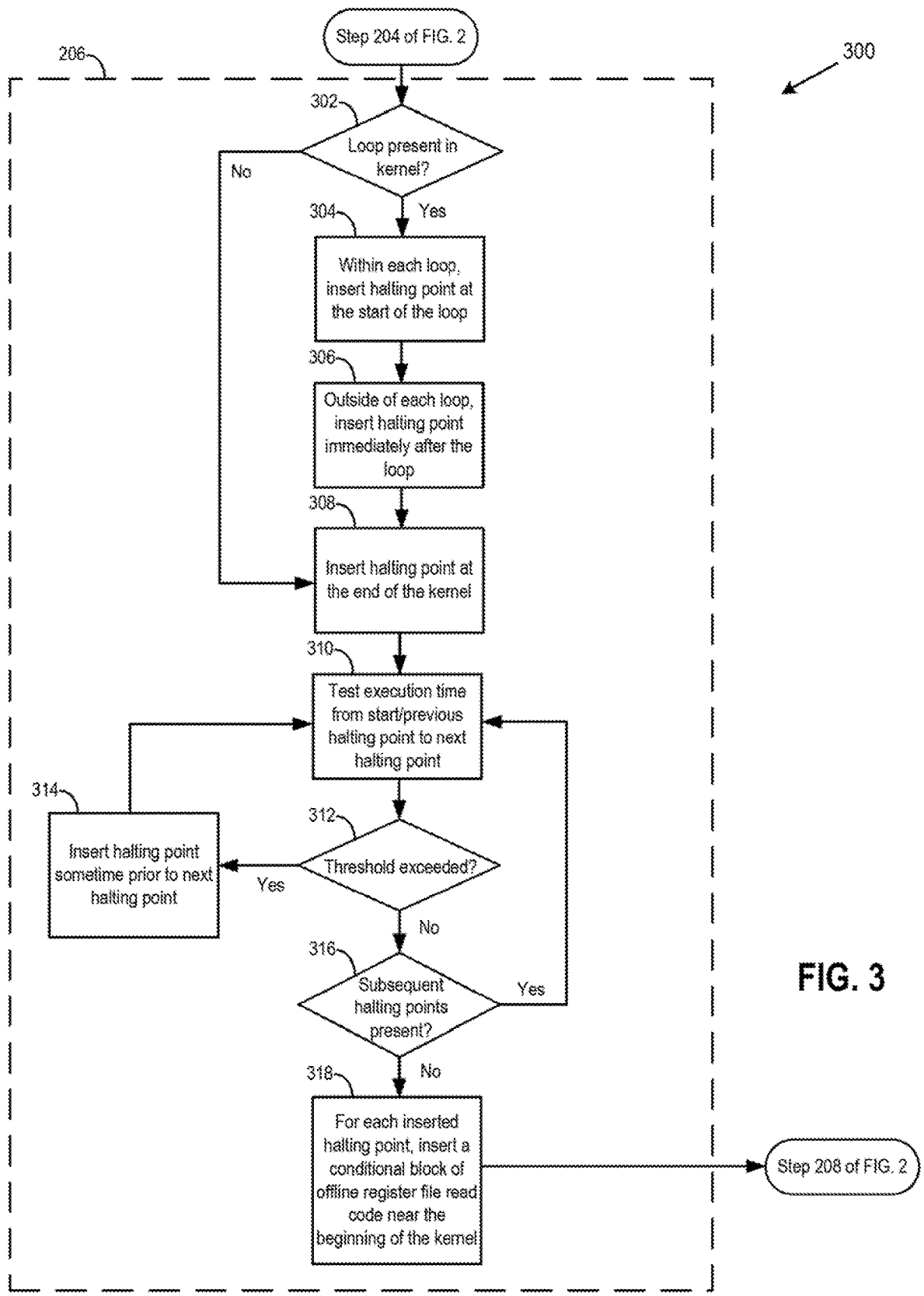
FIG. 3 depicts a flow diagram of a method of augmenting a kernel with conditional halting points, according to an embodiment.

FIG. 3 depicts a flow diagram of a method 300 of augmenting kernel 142 with conditional halting points, as per step 206 of FIG. 2, according to an embodiment. Method 300 of FIG. 3 is an expanded view of step 206 of FIG. 2.

Method 300 is one possible approach to inserting conditional halting points within kernel 142. Other approaches, consistent with the teachings herein, are possible and may be substituted for step 206 of FIG. 2. In an embodiment, method 300 is performed by backend 132 before backend 132 translates a command containing a reference to kernel 142 to the API of CA 134. In another embodiment, method 300 is performed by application 140 or by another application that scans executing applications for the presence of kernel 142 and then augments kernel 142 if needed.

For clarity of explaining method 300, the pseudocode for an exemplary kernel shown in Code Segment 1A will be used as kernel 142 for illustrating the steps of method 300. The exemplary kernel (kernel 142) finds the transpose of matrix A and stores the solution in matrix B. Although the exemplary kernel 142 is the same as that shown previously in step 203 of FIG. 2, the exemplary kernel 142 will be shown as though the kernel modifications of step 203 had not occurred. That is, exemplary kernel 142 will be shown as though method 200 had taken the "No" route from step 202.

At step 302, a determination is made as to whether kernel 142 contains loop(s). Kernel 142 almost always contains loops, so method 300 is likely to continue to step 304 after step 302. If kernel 302 does not contain loops, method 300 continues to step 308.

At step 304, a conditional halting point is inserted within each loop, at the start of the loop. A "halting point" or "conditional halting point," as used herein, includes of three elements, each of which is explained further below: (1) a bookmark (e.g., a program counter) within offline register file 150, (2) a label within kernel 142, and (3) a halting predicate, which is a block of code that executes conditionally depending on the value of a halt variable. In an embodiment, offline register file 150 used in method 300 may be a different offline register file 150 than that used in method 600. This means that two separate halting variables may exist, one for halting execution of kernel 142 as part of implementation of fine grain data coherency in shared memory region 162, and a second halting variable for halting execution of kernel 142 as part of pausing the execution and migration CA workload of kernel 142 onto another host 105.

After insertion of a conditional halting_point at the beginning of the first for-loop, the exemplary kernel appears as follows, with the bolded lines showing the newly-added lines of code.

---

Code Segment 2

```
kernel_transpose(matrix A, matrix B)
{
    thread_id = get_global_id( );
    int row, col;
    for (row = 0; row < A.rows; row++)
    {
        // halting point 1
        registerFile[thread_id * MAX_REGISTERS + BOOKMARK_OFFSET] = 1;
        halting_point_label1:
        if(registerFile[thread_id * MAX_REGISTERS + HALT_OFFSET] == TRUE)
        {
            // write kernel variables and halting point number
            // to offline register file
            return;
        }
```

Code Segment 2

```
        for (col = 0; col < A.cols; col++)
        {
            B[col][row] = A[row][col];
        }
    }
}
```

The value of the bookmark variable within offline register file 150 is set by the first bolded line in the exemplary kernel above, specifically by the line "registerFile[thread_id*MAX_REGISTERS+BOOKMARK_OFFSET]=1". Offline register file 150 is shared by all threads executing kernel 142. Therefore, each thread may only use a portion of offline register file 150, and each thread is configured not to overwrite data specific to other threads that are executing kernel 142.

An index within offline register file 150 is calculated by adding the bookmark offset to the point in offline register file 150 where data for thread_id begins. The point where data for thread_id begins within offline register file 150 is calculated by multiplying thread_id by MAX_REGISTERS. MAX_REGISTERS is the number of registers or saved variables, per thread, in compute kernel 142. It should be noted that at the time of execution of kernel 142, a copy of offline register file 150 may be placed within CA local memory 136 of each CA 134 executing the kernel. This will allow fast access to offline register file 150 by each CA 134. Due to multiple copies of offline register file 150 being located at the various CA local memories 136, virtual CA 128 may implement a synchronization/coherence mechanism that resolves conflicts, at required time points, between data within the various copies of offline register file 150 present among CA local memories 136.

The first bolded line above, "registerFile [thread_id*MAX_REGISTERS+BOOKMARK_OFFSET]=1", sets the bookmark value within offline register file 150 to "1," which means that the data that is stored within offline register file 150 for the thread with id of "thread_id" pertains to halting point 1 within kernel 142. As used herein, the term "bookmark value" means value of the bookmark variable being discussed. If, for example, kernel 142 is suspended at halting point 1 (as shown created above in Code Segment 2), then upon resuming kernel 142, the application managing the resume operation will know that the data for thread of thread_id pertains to the portion of kernel 142 marked by halting point 1. It should be noted that by default, bookmark value within offline register file 150 is zero.

The second bolded line of Code Segment 2 above, "halting_point_label1:", creates a label within kernel 142 for halting point 1. When kernel 142 is resumed after having been halted at halting point 1, kernel 142 jumps to the label of the halting point at which the CA workload or kernel 142 was suspended. The jump or "goto" instruction is inserted into kernel 142 in step 318 of method 300, below.

The rest of the bolded lines of Code Segment 2 represent the halting predicate. The halting predicate begins with a conditional statement in the form of an if-statement: "if (registerFile[thread_id*MAX_REGISTERS+HALT_OFFSET]==TRUE)". The conditional statement tests whether the halt variable within offline register file 150 has been set to true. If so, that means that a suspend command for this CA workload has been issued, such as by a system administrator, application 140 or by another application, or hypervisor 116. Although the indexing into offline register file 150 in the above line is written as though a separate halt variable exists for each thread executing kernel 142, the halt variable may instead be a single variable stored at a single location of offline register file 150. In an embodiment in which a separate halt variable exists for each thread executing kernel 142, a suspend/resume command changes all halt variable values within offline register file 150, for all threads executing kernel 142.

At the time of execution of kernel 142, if the above conditional line of the halting predicate evaluates to true, then all variable values of kernel 142 are written to offline register file 150 and CA workload of kernel 142 is suspended, to be resumed later. For example, in the exemplary kernel of Code Segment 2, the values of variables "row" and "col" would be recorded within offline register file 150. The "return" line within the halting predicate causes kernel 142 to cease execution.

To complete step 304 with regards to the exemplary kernel above, a second conditional halting point is inserted at the beginning of the second for-loop, within that second for-loop. After insertion of this second halting point, the exemplary kernel would appear as show below in Code Segment 3, with the code for the second halting point being in bold font. Halting point 2 functions substantially the same as halting point 1. As shown, the bookmark value has been set to 2 in the first bolded line, and the label "halting_point_label2" has the number "2" in it to indicate that this label is for the second halting point. After step 304, method 300 continues to step 306.

Code Segment 3

```
kernel_transpose(matrix A, matrix B)
{
    thread_id = get_global_id( );
    int row, col;
    for (row = 0; row < A.rows; row++)
    {
        // halting point 1
        registerFile[thread_id * MAX_REGISTERS + BOOKMARK_OFFSET] = 1;
        halting_point_label1:
        if(registerFile[thread_id * MAX_REGISTERS + HALT_OFFSET] ==
TRUE)
```

Code Segment 3

```
        {
            // write kernel variables and halting point number
            // to offline register file
            return;
        }
        for (col = 0; col < A.cols; col++)
        {
            // halting point 2
            registerFile[thread_id*MAX_REGISTERS+BOOKMARK_OFFSET]
            =
            2;
            halting_point_label2:
            if(registerFile[thread_id * MAX_REGISTERS + HALT_OFFSET]
            == TRUE)
            {
                // write kernel variables and halting point number
                // to offline register file
                return;
            }
            B[col][row] = A[row][col];
        }
    }
}
```

At step 306, a halting point is inserted outside of each loop, immediately after each loop. The halting points at step 306 function substantially the same as halting points of step 304 above. The exemplary kernel, after completion of step 306, appears as shown in Code Segment 4, below, with the newly added halting points 3 and 4 being shown in bolded font.

Code Segment 4

```
kernel_transpose(matrix A, matrix B)
{
    thread_id = get_global_id( );
    int row, col;
    for (row = 0; row < A.rows; row++)
    {
        // halting point 1
        registerFile[thread_id * MAX_REGISTERS + BOOKMARK_OFFSET] = 1;
        halting_point_label1:
        if(registerFile[thread_id * MAX_REGISTERS + HALT_OFFSET] ==
TRUE)
        {
            // write kernel variables and halting point number
            // to offline register file
            return;
        }
        for (col = 0; col < A.cols; col++)
        {
            // halting point 2
            registerFile[thread _id*MAX_REGISTERS+BOOKMARK_OFFSET] =
            2;
            halting_point_label2:
            if(registerFile[thread_id * MAX_REGISTERS + HALT_OFFSET]
            == TRUE)
            {
                // write kernel variables and halting point number
                // to offline register file
                return;
            }
            B[col][row] = A[row][col];
        }
        // halting point 3
        registerFile[thread_id * MAX_REGISTERS + BOOKMARK_OFFSET] =
        3;
        halting_point_label3:
        if(registerFile[thread_id * MAX_REGISTERS + HALT_OFFSET] ==
TRUE)
```

Code Segment 4

```
        {
            // write kernel variables and halting point number
            // to offline register file
            return;
        }
    }
    // halting point 4
    registerFile[thread_id * MAX_REGISTERS + BOOKMARK_OFFSET] = 4;
    halting_point_label4:
    if(registerFile[thread_id * MAX_REGISTERS + HALT_OFFSET] == TRUE)
    {
        // write kernel variables and halting point number
        // to offline register file
        return;
    }
}
```

At step 308, a halting point is inserted at the end of kernel 142. The halting point at step 308 functions substantially the same as halting points of step 304 above. The exemplary kernel, after completion of step 308, appears as shown in Code Segment 5, below, with the newly added halting point 5 being shown in bolded font. As can be seen at the bottom of Code Segment 5, step 308 results in a redundant halting point that allows suspension of CA workload of kernel 142 at the same time point as halting point 4. Because of this, step 308 of method 300 is optional.

Code Segment 5

```
kernel_transpose(matrix A, matrix B)
{
    thread_id = get_global_id( );
    int row, col;
    for (row = 0; row < A.rows; row++)
    {
        // halting point 1
        registerFile[thread_id * MAX_REGISTERS + BOOKMARK_OFFSET] = 1;
        halting_point_label1:
        if(registerFile[thread_id * MAX_REGISTERS + HALT_OFFSET] ==
  TRUE)
        {
            // write kernel variables and halting point number
            // to offline register file
            return;
        }
        for (col = 0; col < A.cols; col++)
        {
            // halting point 2
            registerFile[thread_id*MAX_REGISTERS+BOOKMARK_OFFSET] =
            2;
            halting_point_label2:
            if(registerFile[thread_id * MAX_REGISTERS + HALT_OFFSET]
            == TRUE)
            {
                // write kernel variables and halting point number
                // to offline register file
                return;
            }
            B[col][row] = A[row][col];
        }
        // halting point 3
        registerFile[thread_id * MAX_REGISTERS + BOOKMARK_OFFSET] = 3;
        halting_point_label3:
        if(registerFile[thread_id * MAX_REGISTERS + HALT_OFFSET] ==
  TRUE)
        {
            // write kernel variables and halting point number
            // to offline register file
            return;
        }
    }
```

Code Segment 5

```
    // halting point 4
    registerFile[thread_id * MAX_REGISTERS + BOOKMARK_OFFSET] = 4;
    halting_point_label4:
    if(registerFile[thread_id * MAX_REGISTERS + HALT_OFFSET] == TRUE)
    {
        // write kernel variables and halting point number
        // to offline register file
        return;
    }
    // halting point 5
    registerFile[thread_id * MAX_REGISTERS + BOOKMARK_OFFSET] = 5;
    halting_point_label5:
    if(registerFile[thread_id * MAX_REGISTERS + HALT_OFFSET] == TRUE)
    {
        // write kernel variables and halting point number
        // to offline register file
        return;
    }
}
```

Steps 310 through 316 of method 300 are optional. Steps 310 through 316 perform a timed test of execution of kernel 142 to see if the time period to reaching halting points is above a threshold. For example, it may be desirable to be able to suspend a CA workload within at most, e.g. ten second, one minute, five minutes, thirty minutes, or one hour after the suspend command is issued. If the time gap between halting points is larger than the threshold, then more time than desirable may elapse after a decision to suspend occurs. In order to test execution time from one halting point to the next halting point, or from launch of kernel 142 to the first halting point, kernel 142 and working set 152 may be set up on CA 134. Thus, before performing steps 310 through 316, steps 212 and 214 of FIG. 2 may need to be performed. In order to test execution time to a halting point, the halt variable within offline register file 150 may need to be set to true. Also, more than one halt variable may need to be created within offline register file 150 for the purposes of the testing, e.g., one halt variable for each halting point within kernel 142 may need to be created within offline register file 150.

At step 310, the first time that step 310 is reached within method 300, execution time of kernel 142 is timed from launch until the first halting point. In an embodiment, the execution may be on a single CA 134, or on a single core of a single CA 134. At step 312, the time elapsed is compared to a threshold. If time elapsed exceeds the threshold time, then method 300 continues to step 314. Otherwise, method 300 continues to step 316.

At step 314, another halting point is inserted sometime prior to the first halting point, such as for example, midway between the launch and the first halting point. A "midway" point may be measured by number of lines of code, with the loops in kernel 142 being rolled or unrolled. If a loop is "unrolled," this means that a loop that consists of five lines of code but is executed 10 times is treated as fifty lines of code.

After step 314, method 300 returns to step 310 and tests execution time from launch to the newly created halting point of step 314, and then at step 312 compares time elapsed to the threshold time. Method 300 continues to add halting points between the two points being compared until time elapsed is below the threshold time. If time elapsed is below threshold time, method 300 continues to step 316.

At step 316, method 300 determines whether more halting points are present in kernel 142. If so, method 300 returns to step 310 to test execution time between the next halting point and the halting point immediately preceding it. When determining whether more halting points are present in step 316, loops may be rolled or unrolled, as preferred in the test implementation. For example, if a loop containing one halting point is to be executed one thousand times, that loop may be unrolled and be treated as containing one-thousand consecutive halting points.

The method continues through steps 312 and 314 for the two halting points chosen at step 316 (next halting point and the halting point immediately preceding it) in substantially the same manner as for the analysis from starting point to first halting point of kernel 142, described above. When time between all adjacent/consecutive halting points is below threshold, method 300 proceeds from step 316 to step 318.

At step 318, the beginning of kernel 142 is modified for the purpose of a resume operation on kernel 142. When resumed, CA workload of kernel 142 begins at the same point of execution at which it stopped. To accomplish this, variable values of kernel 142 are read from offline register file 150, and then execution of kernel 142 jumps to the halting point label within the code of kernel 142 at the halting point at which execution was suspended.

At step 318, for each halting point inserted in kernel 142, a read predicate is inserted for reading in values of variables of kernel 142, and for jumping to the appropriate line of code of kernel 142. For the purpose of step 318, a halting point is counted only once for each appearance in kernel 142, with loops remaining in a "rolled" state. That is, if a loop contains one halting point and the loop is executed one-hundred times, the halting point counts as a single halting point within kernel 142, not as one-hundred halting points.

Code Segment 6 below shows the addition of five read predicates, one for each halting point, within the example kernel. Each of the newly added read predicates is shown in bold font. In an embodiment, each read predicates is added to the beginning of kernel 142 before the halting point with which the read predicate is associated, at a point of kernel 142 that comes after reading in a thread id and after declaration of at least some variables of kernel 142.

Code Segment 6

```
kernel_transpose(matrix A, matrix B)
{
    thread_id = get_global_id( );
    int row, col;
    // read predicate 1
    if (registerFile(thread_id * MAX_REGISTERS + BOOKMARK_OFFSET] ==
    1)
    {
        // read kernel variables from offline register file
        goto halting_point_label1;
    }
    // read predicate 2
    if (registerFile(thread_id * MAX_REGISTERS + BOOKMARK_OFFSET] ==
    2)
    {
        // read kernel variables from offline register file
        goto halting_point_label2;
    }
    // read predicate 3
    if (registerFile(thread_id * MAX_REGISTERS + BOOKMARK_OFFSET] ==
    3)
    {
        // read kernel variables from offline register file
        goto halting_point_label3;
    }
    // read predicate 4
    if (registerFile(thread_id * MAX_REGISTERS + BOOKMARK_OFFSET] ==
    4)
    {
        // read kernel variables from offline register file
        goto halting_point_label4;
    }
    // read predicate 5
    if (registerFile(thread_id * MAX_REGISTERS + BOOKMARK_OFFSET] ==
    5)
    {
        // read kernel variables from offline register file
        goto halting_point_label5;
    }
    for (row = 0; row < A.rows; row++)
    {
        // halting point 1
        registerFile[thread_id * MAX_REGISTERS + BOOKMARK_OFFSET] = 1;
        halting_point_label1:
        if(registerFile[thread_id * MAX_REGISTERS + HALT_OFFSET] ==
TRUE)
        {
            // write kernel variables and halting point number
            // to offline register file
            return;
        }
        for (col = 0; col < A.cols; col++)
        {
            // halting point 2
            registerFile[thread_id*MAX_REGISTERS+BOOKMARK_OFFSET] =
            2;
            halting_point_label2:
            if(registerFile[thread_id * MAX_REGISTERS + HALT_OFFSET]
            == TRUE)
            {
                // write kernel variables and halting point number
                // to offline register file
                return;
            }
            B[col][row] = A[row][col];
        }
        // halting point 3
        registerFile[thread_id * MAX_REGISTERS + BOOKMARK_OFFSET] = 3;
        halting_point_label3:
        if(registerFile[thread_id * MAX_REGISTERS + HALT_OFFSET] ==
TRUE)
        {
            // write kernel variables and halting point number
            // to offline register file
            return;
        }
    }
```

Code Segment 6

```
    // halting point 4
    registerFile[thread_id * MAX_REGISTERS + BOOKMARK_OFFSET] = 4;
    halting_point_label4:
    if(registerFile[thread_id * MAX_REGISTERS + HALT_OFFSET] == TRUE)
    {
        // write kernel variables and halting point number
        // to offline register file
        return;
    }
    // halting point 5
    registerFile[thread_id * MAX_REGISTERS + BOOKMARK_OFFSET] = 5;
    halting_point_label5:
    if(registerFile[thread_id * MAX_REGISTERS + HALT_OFFSET] == TRUE)
    {
        // write kernel variables and halting point number
        // to offline register file
        return;
    }
}
```

As shown, each read predicate first checks the value of the bookmark variable within offline register file 150. Upon initial launch of kernel 142, before a suspend operation, the default value of the bookmark variable within offline register file 150 is zero. Upon initial launch of kernel 142, the if-statement at the beginning of each read predicate will evaluate to false because the bookmark variable will have a value of zero. However, if kernel 142 had been previously suspended at a halting point, then upon a resume launch of kernel 142, the value of the bookmark variable within offline register file 150 will be equal to the value of the halting point at which kernel 142 was suspended (a non-zero value).

For example, if kernel 142 (or exemplary kernel shown above in Code Segment 6) had been previously suspended at halting point 2, then the value of the bookmark variable within offline register file 150 is equal to 2. The if-statement of read predicate 2 in the example kernel of Code Segment 6 will evaluate to true, and read predicate 2 will execute. Within the body of the code of read predicate 2, value of variables of kernel 142 (e.g., row, col) will be read in from offline register file 150, and execution of kernel 142 (or exemplary kernel) will jump to halting_point_label2, which is a label present at the beginning of the second for-loop and within halting_point 2. When the execution of kernel 142 jumps to halting_point_label2, the "row" and "col" variables are not initialized to zero, but instead, the variables retain the values that had been set within read predicate 2 from offline register file 150 before jumping to halting_point_label2.

After step 318, method 300 ends and proceeds to step 208 of FIG. 2. Returning to FIG. 2, after kernel 142 has been augmented with conditional halting points in step 206, method 200 determines whether CA workload of kernel 142 uses shared virtual memory during execution of kernel 142. Shared virtual memory is explained in the following paragraphs.

When application 140 provides working set 152 to CA 134 (via virtual CA 128), a copy of working set 152 may be created and placed on CA local memory 136 of each CA 134 that will be executing kernel 142. However, working set 152 may be very large in size. Sometimes, providing virtual CA 128 and/or CA 134 with a pointer (an address) to the location of working set 152 within system memory 110 is advantageous over creating one or more copies of working set 152. If a pointer to working set 152 within system memory 110 is provided to CA 134, then CA 134 would access working set 152 while working set 152 is located on system memory 110. The accessing of working set 152 by CA 134 may be through a PCIe bus, or the accessing may be much faster if CA 134 is integrated within CPU 108, for example.

Providing a pointer to CA 134 results in shared memory between CPU 108 and CA 134. The pointer provided to CA 134 is in the virtual address space of application 140, which is running on VM 120. Virtual address space of application 140, running on guest OS of VM 120, is likely to differ from the virtual address space of software running on CA 134 (i.e., virtual address space of the operating system of host 105). Thus, the pointer provided to CA 134 may result in an error without translation from virtual address of the guest process that is executing application 140 to virtual address of host process that is executing CA workload of kernel 142 on CA 134. Such a translation may be accomplished by consulting page tables within hypervisor 116.

Translating the pointer to working set 152 might not be the only virtual address translation used for execution of CA workload of kernel 142. Working set 152 may itself be in the form of a data structure that incorporates pointers, with those pointers being in the virtual address space of the guest process running on VM 120 and executing application 140. The guest virtual address space is likely to differ from host virtual address space of process running CA workload of kernel 142. For example, working set 152 may be a linked list, which, as known in the art, is a list of elements where each element contains a pointer to the next element of the linked list. The pointers in such a linked list would be from the virtual address space of the process that created the linked list, which also may differ from the virtual address space of the process running CA workload of kernel 142 on the host. Creating a custom TLB that translates between virtual addresses of the working set and virtual addresses of the host process that is executing CA workload of kernel 142 on CA 134 allows for sharing of memory on the virtual address level. In this way, a "shared virtual memory" may be implemented between application 140 and CA 134 or software running on CA 134.

At step 208, method 200 determines whether CA workload of kernel 142 uses shared virtual memory during execution of kernel 142. Whether shared virtual memory is used may be determined by application 140. Application 140 may set up shared virtual memory by sending a command to vCA 128 to allocate a region of memory 110 to be used as shared memory region 162. vCA 128 may then request allocation of memory from the operating system of host 105, such as hypervisor 116, and vCA may then provide a handle or a virtual address of shared memory region 162 to application 140.

At step 209A, application 140 determines whether to use relative addressing within a buffer or to use absolute addressing. This may be determined by scanning kernel 142 to determine whether buffers are used within the code of kernel 142. If so, then method 200 continues to step 209B. Otherwise, method 200 continues to step 210. It should be noted that although method 200 flows as though kernel 142 uses either relative addressing or absolute addressing, it is possible that kernel 142 uses both relative addressing (e.g., buffers) and absolute addressing, in which case, both steps 209B and 210 may be executed.

At step 209B, relative addressing shared virtual memory is implemented. Step 209B may be performed by backend 132, application 140, or another module. At step 209B, one or more buffers are created within shared memory region 162. Shared memory region 162 may be created as described with reference to step 208, above. The one or more buffers will store some or all of the working set used by kernel 142 during execution. Buffer identifiers of the created buffers are transmitted or made available to application 140 (and thus, vCPU 160) and to vCA 128 and/or CA 134. Because both application 140 and CA 134 can access the same buffers using buffer identifiers without making a separate copy of the buffers for use of application 140 and CA 134, the buffers are "shared memory" between application 140 and CA 134. Within the buffer, relative addressing is used to indicate position within the buffer. This means that accessing data within the buffer requires the buffer identifier and a relative address.

At step 210, "absolute addressing" shared virtual memory is implemented between application 140 and CA 134. Prior to execution of step 210, a determination may be made as to whether absolute addressing shared virtual memory should be implemented. This determination may be made by scanning kernel 142 to determine whether working set 152 is referenced by a pointer or by a local variable, the pointer being indicative that absolute addressing shared virtual memory should be implemented. The determination may also be made by scanning working set 152 to determine whether working set 152 contains pointers, the pointers being indicative that absolute addressing shared virtual memory should be implemented. A method of implementing shared absolute addressing virtual memory is further described with reference to FIG. 4.

Figure 4:
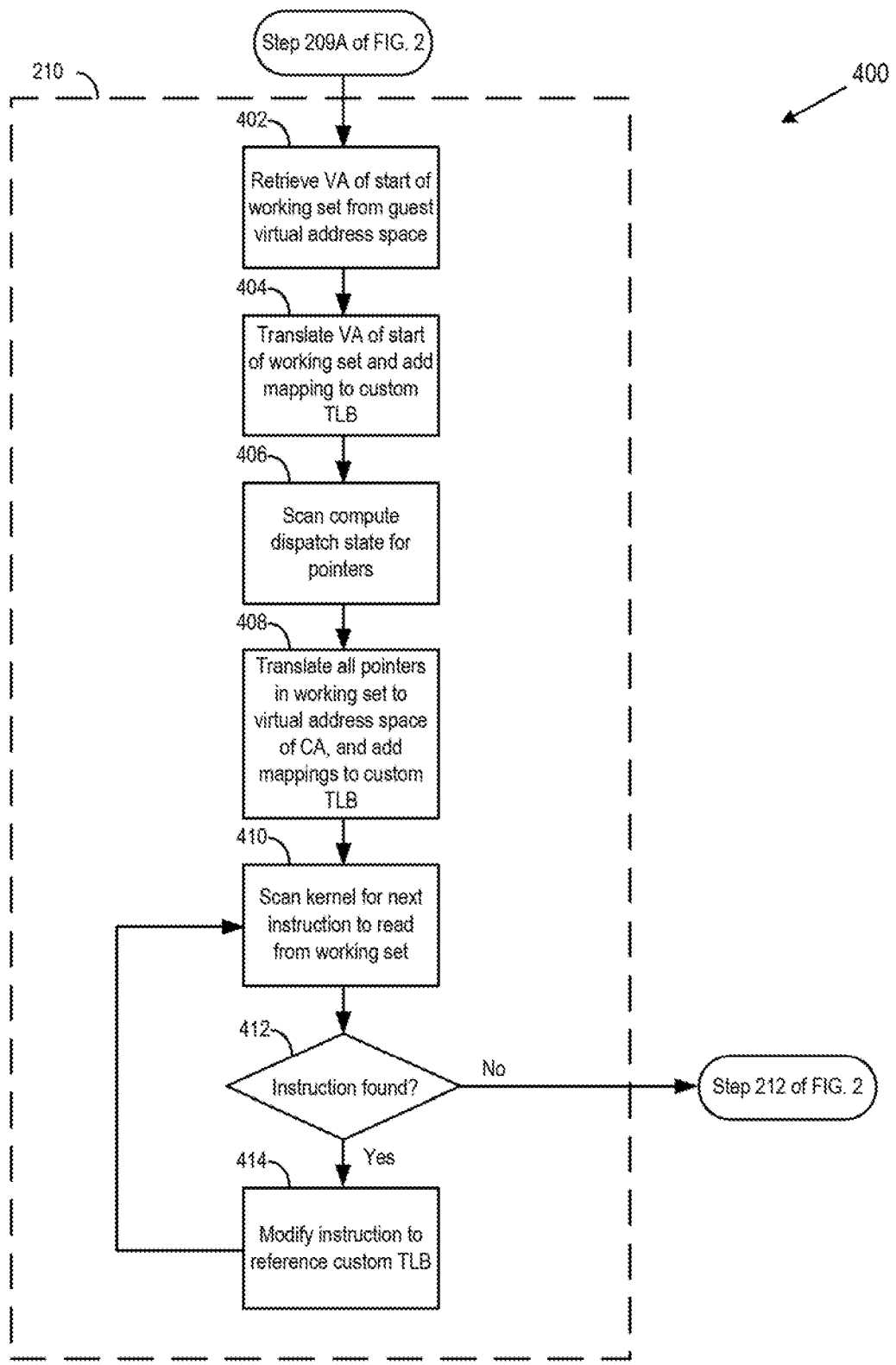
FIG. 4 depicts a flow diagram of a method of implementing an absolute addressing shared virtual memory between a workload running on a compute accelerator and an application executing on a virtual machine that is running on a CPU, according to an embodiment.

FIG. 4 depicts a flow diagram of a method 400 of implementing an absolute addressing shared virtual memory between a workload running on CA 134 and application 140 executing on VM 120, according to an embodiment. Method 400 of FIG. 4 is an expanded view of step 210 of FIG. 2. In FIG. 4, VM 120 is running on CPU 108, through the abstraction of vCPU 160 provided by hypervisor 116. In an embodiment, method 400 is performed by backend 132 before backend 132 translates (a) a command containing a reference to kernel 142 to (b) the API of CA 134. In another embodiment, method 400 is performed by application 140 or by another application that scans executing applications for the presence of kernel 142 and implements shared virtual memory if needed.

At step 402, the virtual address of the start of working set 152 is retrieved from the virtual address space of application 140. Virtual address space of application 140 may be referred to herein as "guest" virtual address space, because VM 120 is a "guest" machine on host 105. That is, if application 140 is not running within VM 120, but is running directly within the operating system of host 105, then the virtual address space of application 140 would be the same as the virtual address space of CA 134, and no absolute addressing virtual shared memory mechanism would need to be implemented.

At step 404, the virtual address of the start of working set 152 (from the virtual address space of application 140) is translated to the virtual address space of the host process that is executing CA workload of kernel 142 on CA 134. The translation results in a mapping, for the start of working set 152, between VA of the guest process executing application 140 to VA of host process executing CA workload of kernel 142 on CA 134. The translation or mapping occurs with assistance from hypervisor 116, such as by referencing tables (e.g., page tables, shadow page tables, nested page tables, or extended page tables). The mapping is then stored in custom TLB 138.

To illustrate further, working set 152 is located within system memory 110 at some physical address of system memory 110. The physical address of working set 152 may be translated to an equivalent virtual address that is used by software running within the operating system of host 105. VM 120 emulates a computer and has a similar physical address and virtual address translation scheme, although the physical address of VM 120 is still "virtual" in the sense that it needs to be translated to a physical address of host 105 in order to obtain data from system memory 110. Translation from a guest virtual address to a host virtual or physical address may be accomplished with the help of hypervisor 116, which contains page tables used for the translation, as is known in the art.

At step 406, compute dispatch state 154 is scanned for the presence of references (pointers) to memory backing the working set. The scanning is done so as to create a mapping between virtual addresses of working set 152 and addresses within virtual address space of the host process that is executing CA workload of kernel 142 on CA 134. The mapping is similar to that performed in step 404 for the starting address of working set 152, and is stored within custom TLB 138.

At step 408, each pointer found within working set 152 of compute dispatch state 154 at step 406 is translated to the virtual address space of the host process that is executing CA workload of kernel 142 on CA 134. The mapping resulting from the translation is then added to custom TLB 138. Assuming that all pointers within working set 152 of compute dispatch state 154 are from the virtual address space of the guest process that is executing application 140, then the mapping can be created by consulting page tables within hypervisor 116, as was done at step 404.

By the conclusion of step 408, custom TLB 138 contains all virtual addresses that are referenced during execution of kernel 142, as well as all mappings from those virtual addresses to the virtual addresses of the virtual address space of the host process that is executing CA workload of kernel 142. After step 408, method 400 proceeds to step 410.

At steps 410 through 414, kernel 142 is modified so that instructions that read data from working set 152 reference custom TLB 138 and obtain the proper virtual address for the read instruction. That is, kernel 142 is modified so that, rather than accessing a virtual address from the virtual address space of the guest process executing application 140, kernel 142 instead accesses a virtual address of the host process executing CA workload of kernel 142.

At step 410, kernel 142 is scanned for the next instruction that contains a pointer to working set 152 and that reads from working set 152 by using that pointer. At step 412, if no instruction is found, then method 400 continues to step 212 of FIG. 2. If an instruction that reads from working set 152 is found, then method 400 continues to step 414. At step 414, the read instruction of kernel 142 is modified to reference custom TLB 138. The read instruction is modified so that a virtual address from the guest process is used as an index into custom TLB 138, the index maps to a virtual address of the host process, and the virtual address from the host process is then used for the data access to working set 152.

For example, Code Segment 7 below provides a portion of a kernel in which a pointer is used to access working set 152.

---
Code Segment 7
---

```
kernel_transpose(matrix A, matrix B)
{
    thread_id = get_global_id( );
    int row, col;
    for (row = 0; row < A.rows; row++)
    {
        for (col = 0; col < A.cols; col++)
        {
            B[col][row] = A[row][col];
        }
    }
}
```

Code Segment 7 above may be modified by step 414 of method 400 to result in Code Segment 8, as follows. Pointers/memory addresses are decomposed into page and intra-page offsets. The TLB translates at the granularity of a page, and assumes all page addresses have a contiguous address space within the page.

---
Code Segment 8
---

```
kernel_transpose(matrix *A, matrix *B, global TLBEntry *tlb)
{
    thread_id = get_global_id( );
    int row, col;
    for (row = 0; row < A.rows; row++)
    {
        for (col = 0; col < A.cols; col++)
        {
            float *svmA, *svmB;
            size_t pageA, pageB;
            size_t pageOffsetA, pageOffsetB;
            //
            // Extract the effective addresses for the individual
            // elements addressed as followed:
            //
            // B[col][row] = A[row][col];
            //
            pageA = (global size_t)(&A[row][col]) >> PAGE_SHIFT;
            pageB = (global size_t)(&B[col][row]) >> PAGE_SHIFT;
            pageOffsetA = (global size_t)(&A[row][col]) & PAGE_MASK;
            pageOffsetB = (global size_t)(&B[col][row]) & PAGE_MASK;
            svmA = (global float *)(tlb[pageA].char_ptr + pageOffsetA);
            svmB = (global float *) (tlb[pageB].char_ptr + pageOffsetB);
            *svmB = *svmA;
        }
    }
}
```

Returning to FIG. 2, after method 400 completes, step 212 is reached. At step 212, kernel 142 is set up on CA 134. The setup is accomplished by one or more setups call(s) from application 140, through CPU 108, to virtual CA 128. The setup call(s) from application 140 to virtual CA 128 is then retransmitted, in the same or modified form, from virtual CA 128 to each CA 134 that virtual CA 128 has chosen to execute CA workload of kernel 142. Setup call(s) from application 140 to CA 134 proceed through the data flow described in FIG. 1D. Setup call(s) from application 140 include providing kernel 142 to virtual CA 128. The setup calls(s) may also include providing a copy of custom TLB 138 and a copy of offline register file 150 to each CA 134, such as by placing a copy of custom TLB 138 and a copy of offline register file 150 on CA local memory 136 of each CA 134 executing kernel 142. The setup call(s) may be in the form of a single call that includes a command buffer, as described above.

The setup call(s) may also include a request for resources. If shared virtual memory is not used, the request for resources may be, for example, a request for memory allocation on CA local memory 136 for working set 152, and for memory allocation for the solution of CA workload of kernel 142. For example, if kernel 142 performs a matrix transpose CA workload, then a request for memory on CA local memory 136 may include a request for memory to store original matrix A, and a request for memory to store solution matrix B. If shared virtual memory is used, then a request to store original matrix A may not be required. As part of step 212, kernel 142 is set up on each CA 134 chosen by virtual CA 128 to perform CA workload of kernel 142. This may be done, for example, by placing a copy of kernel 142 on CA local memory 136 of each CA 134 that will be executing kernel 142.

At step 214, working set 152 is provided to each CA 134 that will be executing kernel 142. If shared virtual memory is not used, application 140, working through CPU 108, sends working set 152 to virtual CA 128, which then sends working set 152 to each CA 134 that will be executing kernel 142. Sending of working set 152 from application 140 to CA(s) 134 proceeds through the data flow described in FIG. 1D, above. If virtual shared memory is used, then step 214 may be skipped, because then working set 152 may be provided to CA 134 by a pointer within kernel 142.

At step 216, CA(s) 134 executes kernel 142. Optionally, CPU 108 may also execute kernel 142. If kernel 142 has not been augmented by step 206, then kernel 142 executes and method 200 continues to step 218 without executing method 500 of FIG. 5. If kernel 142 has been augmented with halting points at step 206, then method 200 continues to step 502 of method 500 in FIG. 5.

Figure 5:
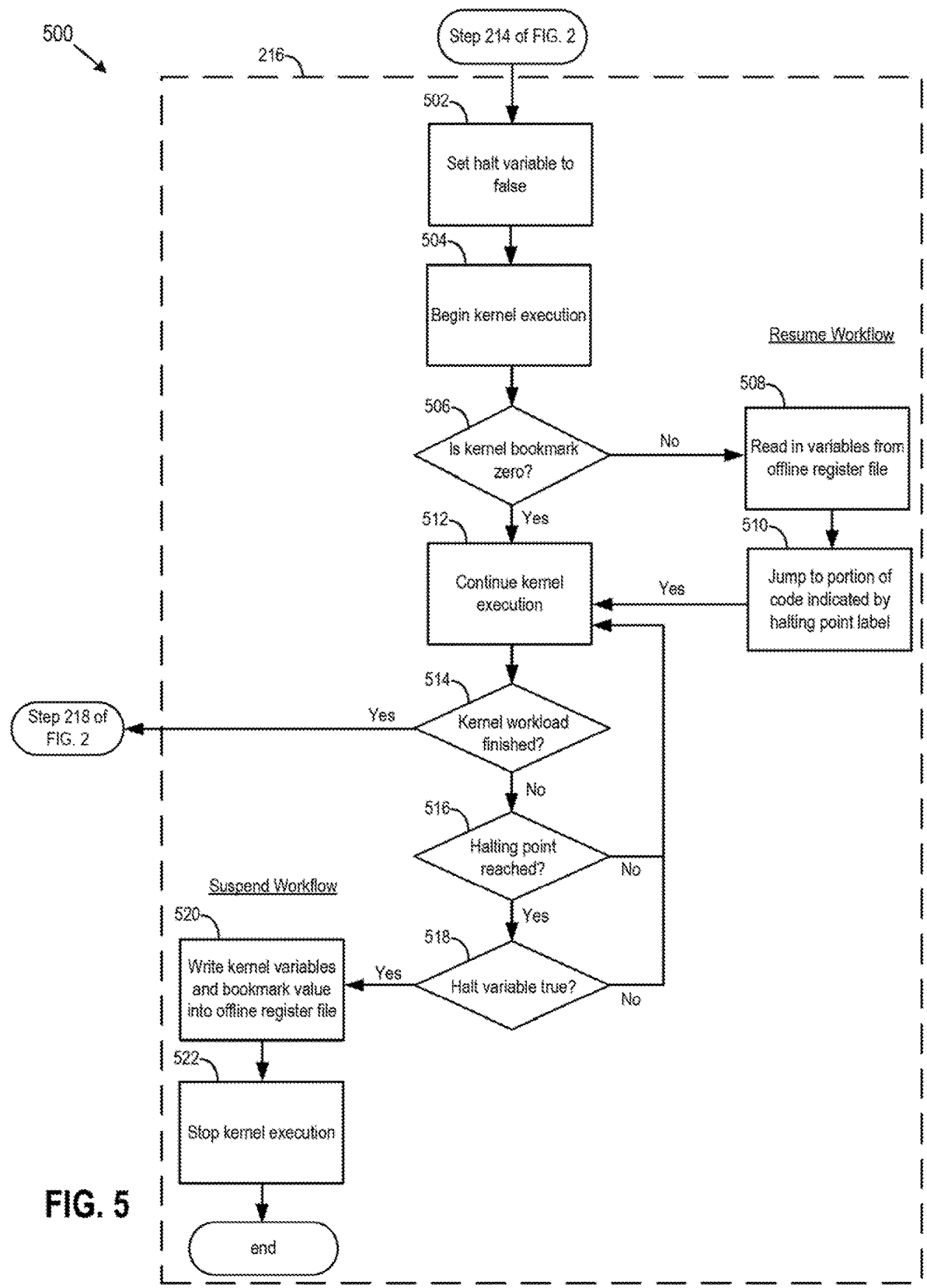
FIG. 5 depicts a flow diagram of a method of executing a kernel that has been augmented with halting points, according to an embodiment.

FIG. 5 is an expanded view of step 216 for executing an augmented kernel. FIG. 5 depicts a flow diagram of a method of executing kernel 142 that has been augmented with halting points by step 206, according to an embodiment. Method 500 encompasses the execution of augmented kernel 142 from start to finish, including suspending the execution before the CA workload is finished and including resuming the execution from a previous suspend. Method 500 is executed by CA 134, and optionally also by CPU 108.

At step 502, the halt variable within offline register file 150 is set to zero. At step 502, the halt variable may be set to zero by default upon initial launch or upon a resume, and so no active step to set halt variable within offline register file 150 to zero may be required.

During method 500, offline register file 150 may be referred to in the singular to collectively refer multiple copies of offline register file 150 present among one or more CA local memories 136 of CAs 134 executing kernel 142. In an embodiment in which several copies of offline register file 150 present among the one or more CA(s) 134 executing kernel 142, a synchronization mechanism exists that synchronizes values within the various files, as needed for proper execution, at required time points. In another embodiment, only a single copy of offline register file 150 exists during execution of kernel 142, such as within system memory 110, and the single copy of offline register file 150 is accessible to all CA(s) 134 executing kernel 142.

At step 504, execution of kernel 142 begins on one or more CA 134, and optionally, on CPU 108. Execution begins by, for example, the sending of a CA workload dispatch operation from vCPU 160 to vCA 128.

At step 506, the value of the bookmark variable in offline register file 150 is checked. If the value of the bookmark variable is non-zero, this indicates that the kernel is resuming from a previous suspend and method 500 proceeds to step 508. Step 504 corresponds to execution of the if-statements within read predicates that were inserted into kernel 142 in step 318 of FIG. 3. These read predicates are shown in bolded font within Code Segment 6, above. If bookmark value is zero, then this execution of kernel 142 is an initial launch, not continuing from a previous suspend, and method 500 proceeds to step 512.

Steps 508 and 510 constitute a "resume workflow" of method 500. Steps 508 and 510 occur if this execution of kernel 142 is a resume after a previous suspend. Steps 508 and 510 are illustrated in code within the body of read predicates shown in bold font in Code Segment 6, above. At step 508, CA 134 reads in variables of kernel 142 from offline register file 150.

At step 510, the execution on of kernel 142 on CA 134 jumps to the portion of code where the previous suspend operation halted the CA workload of kernel 142. That portion of code of kernel 142 is indicated by the bookmark value, which indicates the halting point label of the jump instruction. The jump instruction takes the execution to the portion of the code where the previous suspend operation halted the CA workload of kernel 142. For example, within Code Segment 6, the halting point label follows the "goto" command within a read predicate. After step 510, method 500 continues to step 512, at which execution of kernel 142 continues, starting from the halting point label, such as for the example the label indicated after the "goto" command of the read predicate of Code Segment 6.

At step 512, execution of kernel 142 continues. At step 514, if execution of kernel 142 has completed, then method 500 proceeds to step 218 of FIG. 2. If execution of kernel 142 has not completed, then method 500 proceeds to step 516.

At step 516, if a halting point has not been reached and the kernel workload is not finished, then method 500 returns to step 512, where execution of kernel 142 continues. If at step 516 a halting point has been reached, then the value of the halt variable within offline register file 150 is checked at step 518. Step 518 corresponds to execution of the conditional within the if-statement of the halting predicate shown in bold font in Code Segment 2, above. If the halt variable is false, as would be the usual case, then method 500 proceeds to step 512 and execution of kernel 142 continues uninterrupted. If the halt variable is true, this indicates that CA workload of kernel 142 is to be suspended, and method 500 proceeds to step 520.

Steps 520 and 522 constitute a "suspend workflow" of method 500. Steps 520 and 522 occur if someone, like an administrator or user, sends a suspend command to CA 134, such as to schedule a higher priority CA workload. Alternatively, the suspend command may be sent automatically if something like a software module determines that this execution of kernel 142 should be suspended, such as for load balancing reasons.

At step 520, CA 134 writes the value of kernel variables and the value of the bookmark variable to offline register file 150. Step 520 corresponds to execution of the body of the if-statement of the halting predicate shown in bold font in Code Segment 2, above. At step 522, execution of kernel 142 stops and method 500 ends. Step 522 corresponds to the return statement within a halting predicate, such as the halting predicate shown in Code Segment 2. After step 522, method 500 ends and does not return to the method of FIG. 2.

After the suspend workflow of method 500, a variety of operations may be performed on the suspended CA workflow. One such operation is the migration of VM 120, on which application 140 is/was executing, to a new host 105. Migrating VM 120 on which application 140 is executing would also migrate CA workload of kernel 142. Migrating VM 120 would also migrate application 140, kernel 142, offline register file 150, working set 152, any results/solutions generated by the executing kernel 142 before suspending, and optionally custom TLB 138. The new host 105 may be located on data center 102 or remote data center 104, across network 146 from data center 102. A VM 120 may be migrated to a new host 105 by methods known in the art to migrate a VM, such as the method described in U.S. patent application Ser. No. 13/760,868, filed Feb. 6, 2013, or the method described in U.S. patent application Ser. No. 14/798, 483, filed Jul. 14, 2015. The entire contents of both of these applications are incorporated by reference herein.

After a migration, CA workload of kernel 142 may be resumed on a new host 105. Prior to resuming, steps 210, 212, and 214 of FIG. 2 may need to be performed again, so as to refresh custom TLB 138 with new virtual addresses reflecting the new virtual address space of the new host 105, so as to set up kernel 142 on the new CA 134, and so as to provide working set 152 to new CA 134. After steps 210, 212, and 214, the resume workflow (including steps 508 and 510) of method 500 would be performed to execute kernel 142 on the new host 105.

After completion of method 500 through step 514, either through uninterrupted execution or after the resume workflow, method 500 proceeds to step 218 of FIG. 2. Step 218 of FIG. 2 is an optional step. After step 216, the results of kernel execution are ready for retrieval. At step 218, the results are optionally retrieved from CA local memory 136 by application 140. The results may remain on CA local memory 136 if, for example, application 140 is to perform a subsequent CA workload that uses the results as a new working set 152 for the subsequent CA workload.

The results of CA workload of kernel 142 may be distributed among several CA local memories 136. For example, if the CA workload was a matrix transpose, then virtual CA 128 may have divided up the transposition work among several CAs 134. Prior to application 140 retrieving results of CA workload at step 218, the results from several CA local memories 136 may need to be combined into one complete results set, such as into one complete transposed matrix. In an embodiment, the combining may be performed by virtual CA 128. After step 218, method 200 ends.

Figure 7:
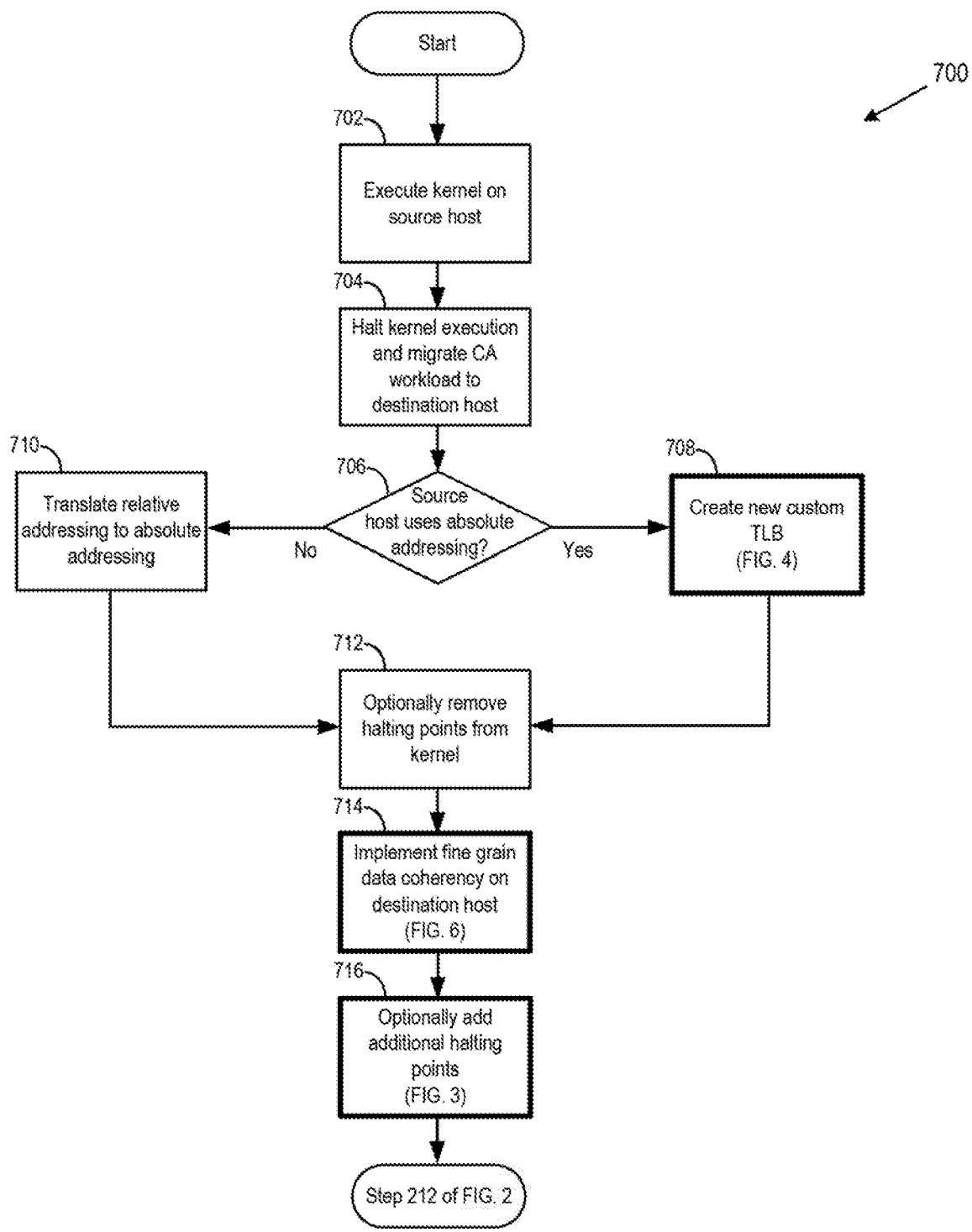
FIG. 7 depicts a flow diagram of a method of migrating a CA workload from a source host that has fine grain data coherency and either relative or absolute memory addressing, to a destination host that has coarse grain data coherency and absolute memory addressing, according to an embodiment.

FIG. 7 depicts a flow diagram of a method of migrating a CA workload from (a) a source host that has fine grain data coherency and either relative or absolute memory addressing, to (b) a destination host that has coarse grain data coherency and absolute memory addressing, according to an embodiment. Source host and destination host may be, for example, host $105_1$ and $105_2$, respectively. In an embodiment, destination host $105_2$ may be located in remote data center 104 while source host $105_1$ is located in data center 102.

At step 702, kernel 142 is executed on source host $105_1$. The execution may be performed by, for example, method 200 of FIG. 2.

At step 704, execution of kernel 142 on source host $105_1$ is halted, such as by setting a halt variable within offline register file 150 to true. After halting, CA workload of kernel 142 is migrated to destination host $105_2$. The migrated CA workload may include kernel 142, offline register file 150, working set 152, as well as any results generated by the execution of kernel 142 up to the time of halting. In an embodiment, the VM 120 in which application 140 is executing is migrated to destination host $105_2$, along with the CA workload. In another embodiment, application 140, which originally launched kernel 142 of the migrated CA workload, is not migrated to destination host $105_2$ and remains on source host $105_1$. As part of step 704 and as part of migration, a shared memory region 162 is created on destination host $105_2$ for placement some or all components of CA migrated workload. Shared memory region 162 of destination host $105_2$ may be created similarly to the description of step 208 of FIG. 2. Shared memory region 162 of destination host $105_2$ may be shared between vCPU 160 of the migrated VM 120 on destination host $105_2$ and CA 134 of destination host $105_2$.

At step 706, destination host $105_2$ determines whether source host $105_1$ uses absolute addressing. This may be determined by scanning kernel 142 to determine whether buffer(s) or absolute addressing is used by data access instructions. If source host $105_1$ uses absolute addressing, method 700 continues to step 708. Otherwise, method 700 continues to step 710.

At step 708, a new custom TLB is created by performing method 400 of FIG. 4, as described above. That is, although kernel 142 has been migrated from a host that uses absolute addressing to another host that uses absolute addressing, the differences in virtual address space between (a) application 140 and (b) host $105_1$ may be different than the differences between (c) application 140 and (d) host $105_2$, so a new custom TLB may is created at step 708.

At step 710, relative addressing of one or more buffers of CA workload is translated into absolute addressing that is used by destination host $105_2$ (e.g., CA 134 of host $105_2$). The translation is done by creating a per-buffer translation scheme. Each buffer migrated from host $105_1$ to host $105_2$ has a starting point and an ending point. When CA workload is migrated from host $105_1$ to host $105_2$, a contiguous region in memory 110 of host $105_2$ is allocated for each migrated buffer, the contiguous region being equal or approximately equal in size to the size of the buffer placed in that region.

To create a per-buffer translation scheme, for each buffer, the starting virtual address in the address space of CA 134 of destination host $105_2$ is noted as position 0 (zero) of the buffer, and for each subsequent position of the buffer, a multiple of an offset is added to the starting virtual address. The offset may be equal in size to the maximum amount of data that can be placed within each position of the buffer being translated. The formula for obtaining the virtual address at a relative position of the buffer may be: starting_virtual_address+relative_buffer_address. This formula can be used to create a per-buffer custom TLB to translate relative buffer addressing within kernel 142 to absolute addressing of virtual address space of CA 134 of destination host $105_2$. Alternatively, the formula may be executed by CA 134 each time a data access instruction within kernel 142 is reached by CA 134, to translated the relative-addressing instruction within kernel 142 to an absolute-addressing instruction.

At step 712, optionally, some or all halting points of kernel 142 added by host $105_1$ are removed so that adding halting points may be performed anew, if needed.

At step 714, fine grain data coherency within shared memory region 162 of host $105_2$ is implemented. The implementation is required because hardware platform $106_1$ was configured to allow for fine grain data coherency without the need for implementing fine grain data coherency by modifying kernel 142 via method 600. Hardware platform $106_2$ is configured for coarse grain data coherency. Therefore, fine grain data coherency is implemented through software as described in FIG. 6, above.

At step 716, optionally additional halting points are added to kernel 142. Step 716 is performed by executing method 300 of FIG. 3, as described above. After step 716, method 700 continues to step 212 of method 200 to execute steps 212-218, after which methods 200 and 700 end.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

I claim:

1. A method of implementing fine grain data coherency of a shared memory region of a first host computer comprising at least one central processing unit (CPU) and one or more compute accelerators (CAs), the at least one CPU executing an operating system and an application, the application associated with a compute kernel separate from the operating system, the compute kernel configured to execute on a CA, the method comprising:
   allocating the shared memory region within the first host, the shared memory region being shared by the application and the one or more CAs;
   locating, within the compute kernel, a data write instruction to the shared memory region;
   modifying the compute kernel to add a halting point after the located data write instruction;
   configuring the operating system to suspend execution at the halting point of the compute kernel (a) at an interval, or (b) in response to an occurrence of an event; and
   executing, on the one or more CAs, the compute kernel.

2. The method of claim 1, wherein the first host computer further comprises one or more virtual machines (VMs), the application is executing within a first VM of the one or more VMs, wherein the operating system is a virtualization software and wherein the one or more VMs are running on top of the virtualization software.

3. The method of claim 2, wherein modifying a value of a halt variable within a file causes the compute kernel to suspend execution at the halting point, and wherein the configuring comprises configuring the virtualization software to set the value of the halt variable (a) at the interval, or (b) in response to the occurrence of the event.

4. The method of claim 2, the method further comprising, prior to the allocating:
receiving from a second host computer, the first VM, wherein the first VM comprises the compute kernel and a working set, the working set comprising a buffer of data used by the compute kernel while executing on a second one or more CAs of the second host computer.

5. The method of claim 4, wherein the compute kernel is designed to access the shared memory region using relative addressing, the method further comprising, translating the relative addressing of the compute kernel into absolute addressing, wherein the translating comprises:
placing the buffer into the shared memory region, a start of the buffer being located at a starting absolute address within the shared memory region; and
translating a relative address within the buffer to an absolute address within the shared memory region by adding the starting absolute address to a product of the relative address and an offset, wherein the offset is a size of data that can fit at a single position of the buffer.

6. The method of claim 3, wherein the configuring the virtualization software comprises configuring the virtualization software to set the value of the halt variable in response to a request, by the first VM, to access data within the shared memory region.

7. The method of claim 3, wherein the configuring the virtualization software comprises setting memory pages assigned to the shared memory region as write-only by marking corresponding page table entries of one or more page tables maintained by the virtualization software as write-only.

8. The method of claim 1, wherein the allocating the shared memory region comprises sending a request by the application to the CA to allocate the shared memory region.

9. The method of claim 2, the method further comprising:
receiving, by the virtualization software, a request from the application to access the shared memory region;
halting execution of the compute kernel at the halting point;
performing the request from the application to access the shared memory region; and
resuming execution of the compute kernel at the halting point.

10. The method of claim 9, the first host computer comprising a queue, the queue comprising requests to write to the shared memory region, wherein the halting causes, prior to performing the request from the application to access the shared memory region, execution of all the requests to write to the shared memory region that are located within the queue.

11. A non-transitory computer readable medium comprising instructions to be executed in a processor of a computer system, the instructions when executed in the processor cause the computer system to carry out a method of implementing fine grain data coherency of a shared memory region of a first host computer comprising at least one central processing unit (CPU) and one or more compute accelerators (CAs), the at least one CPU executing an operating system and an application, the application associated with a compute kernel separate from the operating system, the compute kernel configured to execute on a CA, the method comprising:
allocating the shared memory region within the first host, the shared memory region being shared by the application and the one or more CAs;
locating, within the compute kernel, a data write instruction to the shared memory region;
modifying the compute kernel to add a halting point after the located data write instruction;
configuring the operating system to suspend execution at the halting point of the compute kernel (a) at an interval, or (b) in response to an occurrence of an event; and
executing, on the one or more CAs, the compute kernel.

12. The non-transitory computer readable medium of claim 11, wherein the first host computer further comprises one or more virtual machines (VMs), the application is executing within a first VM of the one or more VMs, wherein the operating system is a virtualization software and wherein the one or more VMs are running on top of the virtualization software.

13. The non-transitory computer readable medium of claim 12, wherein modifying a value of a halt variable within a file causes the compute kernel to suspend execution at the halting point, and wherein the configuring comprises configuring the virtualization software to set the value of the halt variable (a) at the interval, or (b) in response to the occurrence of the event.

14. The non-transitory computer readable medium of claim 12, the method further comprising, prior to the allocating:
receiving from a second host computer, the first VM, wherein the first VM comprises the compute kernel and a working set, the working set comprising a buffer of data used by the compute kernel while executing on a second one or more CAs of the second host computer.

15. The non-transitory computer readable medium of claim 14, wherein the compute kernel is designed to access the shared memory region using relative addressing, the method further comprising, translating the relative addressing of the compute kernel into absolute addressing, wherein the translating comprises:
placing the buffer into the shared memory region, a start of the buffer being located at a starting absolute address within the shared memory region; and
translating a relative address within the buffer to an absolute address within the shared memory region by adding the starting absolute address to a product of the relative address and an offset, wherein the offset is a size of data that can fit at a single position of the buffer.

16. The non-transitory computer readable medium of claim 13, wherein the configuring the virtualization software comprises configuring the virtualization software to set the value of the halt variable in response to a request, by the first VM, to access data within the shared memory region.

17. The non-transitory computer readable medium of claim 13, wherein the configuring the virtualization software comprises setting memory pages assigned to the shared memory region as write-only by marking corresponding page table entries of one or more page tables maintained by the virtualization software as write-only.

18. The non-transitory computer readable medium of claim 11, wherein the allocating the shared memory region comprises sending a request by the application to the CA to allocate the shared memory region.

19. The non-transitory computer readable medium of claim 12, the method further comprising:
receiving, by the virtualization software, a request from the application to access the shared memory region;
halting execution of the compute kernel at the halting point;
performing the request from the application to access the shared memory region; and
resuming execution of the compute kernel at the halting point.

20. A computer system comprising:
a first host computer comprising a shared memory region, at least one central processing unit (CPU) and one or more compute accelerators (CAs), the at least one CPU executing an operating system and an application, the application associated with a compute kernel separate from the operating system, the compute kernel configured to execute on a CA;
a processor, wherein the processor is programmed to carry out a method of implementing fine grain data coherency of the shared memory region, the method comprising:
allocating the shared memory region within the first host, the shared memory region being shared by the application and the one or more CAs;
locating, within the compute kernel, a data write instruction to the shared memory region;
modifying the compute kernel to add a halting point after the located data write instruction;
configuring the operating system to suspend execution at the halting point of the compute kernel (a) at an interval, or (b) in response to an occurrence of an event; and
executing, on the one or more CAs, the compute kernel.

* * * * *